United States Patent
Juranitch et al.

(10) Patent No.: US 6,523,422 B1
(45) Date of Patent: *Feb. 25, 2003

(54) ISOLATION ARRANGEMENT FOR SYSTEM UNDER TEST

(75) Inventors: James C. Juranitch, Walled Lake, MI (US); Robert D. Olschefski, Farmington, MI (US)

(73) Assignee: Veri-Tek Inc., Wixom, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/106,807

(22) Filed: Jun. 29, 1998

(51) Int. Cl.[7] .................................................. G01L 3/02

(52) U.S. Cl. ................................................. 73/862.322

(58) Field of Search .................. 73/862.322, 118.1, 73/865.9, 862.09

(56) References Cited

U.S. PATENT DOCUMENTS

| | | | |
|---|---|---|---|
| 3,016,740 A | * 1/1962 | Raidl | 73/118 |
| 3,712,130 A | 1/1973 | Weichbrodt et al. | 73/162 |
| 4,020,678 A | 5/1977 | Laue | 73/67 |
| 4,054,280 A | 10/1977 | Alberts | 269/34 |
| 4,159,642 A | * 7/1979 | Hudson et al. | 73/118 |
| 4,252,023 A | 2/1981 | Pomernacki | 73/593 |
| 4,520,659 A | * 6/1985 | Lucia et al. | 73/118 |
| 4,550,604 A | 11/1985 | Sugimoto et al. | 73/587 |
| 4,592,228 A | * 6/1986 | Lucia | 73/118 |
| 4,649,743 A | 3/1987 | Sugimoto et al. | 73/162 |
| 4,711,124 A | 12/1987 | Cagle | 73/162 |
| 4,732,036 A | * 3/1988 | Weeder | 73/118.1 |
| 4,788,856 A | 12/1988 | Felger | 73/118.1 |
| 4,931,949 A | 6/1990 | Hernandez et al. | 364/497 |
| 5,142,903 A | * 9/1992 | Mizushina et al. | 73/118.1 |
| 5,201,501 A | 4/1993 | Fassler | 269/32 |
| 5,309,378 A | 5/1994 | Beierle | 364/574 |
| 5,537,865 A | 7/1996 | Shultz | 73/118.1 |
| 5,576,496 A | * 11/1996 | Carlini et al. | 73/460 |
| 5,728,938 A | 3/1998 | Choi et al. | 73/593 |
| 5,800,331 A | 9/1998 | Song | 494/7 |
| 6,170,326 B1 | * 1/2001 | Juranitch et al. | 73/162 |

FOREIGN PATENT DOCUMENTS

| | | | |
|---|---|---|---|
| DE | 3926281 A1 | 2/1991 | G01M/13/02 |
| EP | 0442010 A1 | 2/1990 | G01H/1/00 |
| EP | 0 500 405 A1 | 8/1992 | B23Q/1/24 |
| GB | 2 089 707 A | 6/1982 | B23Q/1/24 |
| WO | WO97/31253 A1 | 8/1997 | G01M/13/00 |

* cited by examiner

*Primary Examiner*—Hezron Williams
*Assistant Examiner*—Jewel V. Thompson
(74) *Attorney, Agent, or Firm*—Raphael A. Monsanto; Benita J. Rohm

(57) ABSTRACT

An arrangement for isolating an energy transfer system while it is subjected to a test process for noise. The energy transfer system is of the type having an energy input and at least one energy output, and may be mechanical or electrical. The isolation arrangement has a base that supports the energy transfer system. An isolation support supporting the energy transfer system, yet affords multiple degrees of freedom with respect to the base. The energy transfer system is clamped in a manner that permits the multiple degrees of freedom with respect to the base, via an engagement arrangement that secures the energy transfer system to the isolation support. The engagement arrangement has a first position with respect to the base wherein the energy transfer system is installable on, and removable from, the isolation support, and a second position wherein the energy transfer system is secured to the isolation support means. Engagement is effected by an actuation element that is effectively decoupled from the base after clamping is achieved. In a mechanical embodiment, rotatory energy is provided to the energy transfer system exclusively as torque, without any significant axial bias. Additionally, torques for signal analysis enable "pass/fail" determinations to be made with respect to noisiness of the system under test, as well as the presence of bumps and nicks in gear systems under test.

72 Claims, 15 Drawing Sheets

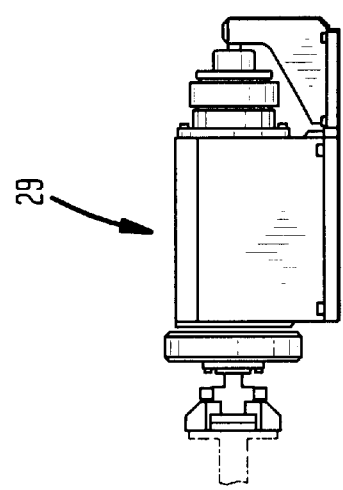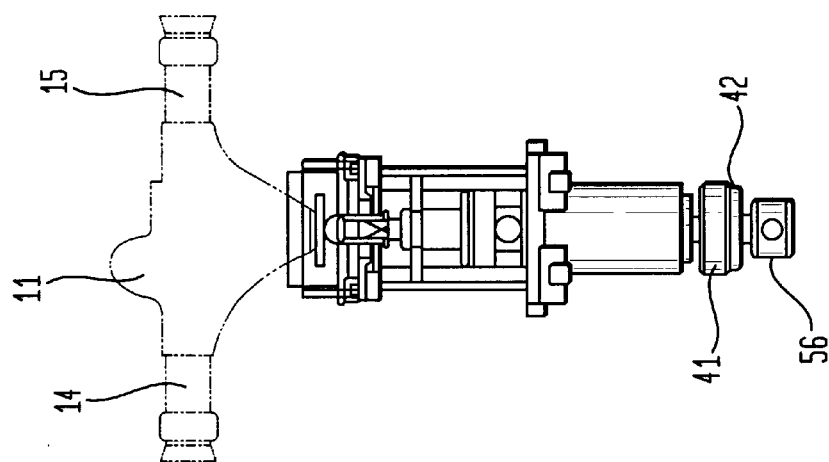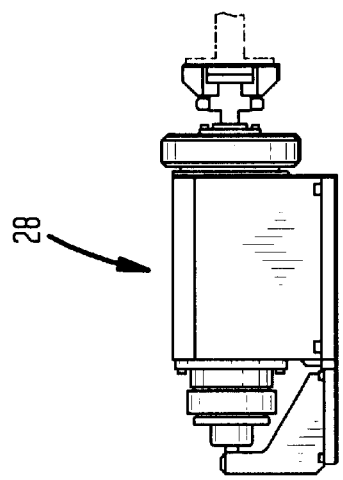
FIG. 3

ISOLATION ARRANGEMENT FOR SYSTEM UNDER TEST

BACKGROUND OF THE INVENTION

1. Field of the Invention

This invention relates generally to systems for testing electrical and mechanical energy transfer systems that exhibit vibratory and other responses to electrical or mechanical input energy, and more particularly, to an arrangement that isolates a mechanical or electrical system under test and produces signals and data corresponding to a plurality of operating characteristics of the system under test in response to the input energy.

2. Description of the Related Art

Noise testing of gears to date has been attempted by methods that rigidly mount the gear or axle assemblies in one or more planes. Some other previous attempts chose to have one of the rigidly mounted planes resonate at a frequency sympathetic to gear noise. None of these methods, or any other rigidly mounted test system has been successful. This is due to the lack of repeatability of the previous systems, largely as a result of interacting resonances, and external background noise that is transferred through the rigid mounting system. This is especially true in a production test environment.

These deficiencies in the prior art are most evident in the axle industry. At this time, the only widely accepted way of measuring gear noise is to acquire an assembled axle and install it in a test car. A specially trained individual then drives the car over its typical operating range while carefully listening for axle gear noise. The individual rates the quality of axle gear noise on a scale that is typically 0 to 10. Ten is usually a perfect axle, i.e. one that has no gear noise. This method is made difficult by:

1 The lack of available trained noise rating individuals
2 The cost of test cars.
3 The lack of quality roads or test tracks on which to perform a repeatable and accurate test.
4 The time required for each test.
5 The subjectivity that humans bring into the rating system Typically less than a dozen axles can be tested by a major manufacturer in one shift due to all of the above complications. This low number is not statistically valid when it is considered that most manufacturers make thousands of axles each day. Even with all of the above problems, human testers in cars are the only widely accepted method of axle testing in the industry due to the lack of a better more reliable testing method. This lack of a scientific basis for rating axles and gear systems is made worse when the reader considers that modern cars are extremely quiet, and are evolving to become more quite. This market direction increases the pressure on axle and other gear manufacturers to make their products quieter. There is a need for a system that offers gear and axle manufacturers a repeatable, reliable, accurate and practical way of measuring gear noise in production or laboratory environments.

It is, therefore, an object of this invention to provide a system for testing an energy transfer system, such as a vehicle axle, quickly and inexpensively, and achieving repeatable results.

SUMMARY OF THE INVENTION

The foregoing and other objects are achieved by this invention which provides, in a first apparatus aspect thereof, an arrangement for isolating an energy transfer system while it is subjected to a test process for noise, the energy transfer system being of the type having an energy input and at least one energy output. In accordance with the invention, the arrangement is provided with a base for supporting the arrangement and the energy transfer system. An isolation support supports the energy transfer system whereby the energy transfer system is translatable in at least one plane of freedom with respect to the base. Additionally, an engagement arrangement is provided for securing the energy transfer system to the isolation support, the engagement arrangement having a first position with respect to the base wherein the energy transfer system is installable on, and removable from, the isolation support, and a second position wherein the energy transfer system is secured to the isolation support.

In one embodiment, there is further provided an energy supply coupled to the energy transfer system for supplying energy thereto when the engagement arrangement is in the second position. The energy transfer system is, in one embodiment of the arrangement of the present invention, a mechanical energy transfer system, and in such an embodiment, the energy supply, which is a part of the arrangement of the invention, is in the form of a source of rotatory mechanical energy. A rotatory coupler couples the source of rotatory mechanical energy to the energy transfer system.

In a highly advantageous embodiment of the invention, the mechanical energy transfer system test has forward and reverse directions of operation, and drive and coast modes of operation for each of the forward and reverse directions of operation. The mechanical energy transfer system contains at least a pair of meshed elements, at least one of the pair of meshed elements being a gear having a plurality of gear teeth thereon, the gear teeth each having first and second gear tooth surfaces for communicating with the other element of the pair of meshed elements. A mechanical energy transfer communication between the pair of meshed elements is effected primarily via the respective first gear tooth surfaces during forward-drive and reverse-coast modes of operation, and primarily via the respective second gear tooth surfaces during forward-coast and reverse-drive modes of operation. With such a system under test, the arrangement of the present invention is provided with a first acoustic sensor arranged at a first location in the vicinity of the mechanical energy transfer system for producing a first signal that is responsive substantially to a qualitative condition of the first gear tooth surfaces. A second acoustic sensor is arranged at a second location in the vicinity of the mechanical energy transfer system, and produces a second signal that is responsive substantially to a qualitative condition of the second gear tooth surfaces. The first and second locations are distal from each other on opposite sides of the pair of meshed elements.

In a further embodiment of the invention, the rotatory coupler is provided with a resilient coupler arrangement that transmits rotatory motion there across over a predetermined range of rotatory motion transmission angles. The resilient coupler arrangement is provided with first and second coupler portions, the first and second coupler portions being rigidly coupled rotationally to each other. Additionally, they are axially resiliently coupled to each other, whereby the first and second coupler portions are synchronously rotatable over the predetermined range of rotatory motion transmission angles.

In yet a further embodiment of the invention, the resilient coupler arrangement is provided with first and second coupler portions, the first and second coupler portions being rigidly coupled rotationally to each other, and radially resiliently coupled to each other. Thus, the first and second coupler portions are synchronously rotatable over a predetermined range of axial displacement.

A torque sensor advantageously is interposed, in a highly advantageous embodiment, between the source of rotatory mechanical energy and the energy transfer system. The torque sensor produces a signal that is responsive to a torque applied by the source of rotatory mechanical energy to the energy transfer system. The torque sensor is provided with a torque-transmitting element that has a predetermined deformation characteristic. Thus, the torque-transmitting element becomes deformed in response to the torque that is applied by the source of rotatory mechanical energy to the energy transfer system. In this embodiment of the invention, the torque sensor further is provided with a strain sensor that is coupled to the torque-transmitting element for producing a strain signal responsive to the predetermined deformation characteristic of the torque-transmitting element. The strain signal, therefore, is proportional to the torque.

It is very advantageous to determine the residual torque required to initiate motion of the system under test. The torque sensor is therefore arranged to produce a static torque signal that is responsive to the magnitude of the torque required to initiate rotatory motion in the mechanical energy transfer system. In addition, it is advantageous that the torque sensor be arranged to produce a dynamic torque signal that is responsive to the magnitude of torque required to maintain rotatory motion in the mechanical energy transfer system.

In a particularly advantageous embodiment of the invention, the energy transfer system under test is an electrical energy transfer system, and the energy supply is provided with a source of electrical energy. In such an embodiment, there is provided an electrical load for receiving an output electrical energy from the energy transfer system when the engagement arrangement is in the second position. A first sensor is arranged to communicate with the energy transfer system for producing an information signal that is responsive to an operating characteristic of the energy transfer system in response to the energy supplied by the energy supply. The first sensor is arranged to contact the energy transfer system to produce the signal. Alternatively, the first sensor is arranged to contact the isolation support for producing the information signal.

The first sensor is arranged, in one embodiment of the invention, so as to be translatable relative to the energy transfer system.

When it is desired to monitor an acoustic energy emitted by the system under test, a microphone is provided for producing a signal that is responsive to an acoustic energy issued by the energy transfer system in response to the energy supplied by the energy supply. A laser sensor may additionally be provided for producing a signal that is responsive to a displacement of the energy transfer system in response to the energy supplied by the energy supply. In still further embodiments, an accelerometer or a velocity sensor is employed.

The resilient support element that supports the energy transfer system, in a preferred embodiment of the invention, is configured to exclude a natural frequency of any combination of the base, the engagement arrangement, and the energy transfer system. Thus, the vibratory or acoustic energy provided by the system under test constitutes all of the energy that would be measured and analyzed, without contribution or modification thereof by the structure of the support system.

Preferably, the isolation support supports the energy transfer system so that it is translatable in at least a second plane of freedom with respect to the base.

In a highly advantageous embodiment of the invention, there is provided an engagement driver that has a first portion that is coupled to the base, and a second end that is coupled to the engagement arrangement. The engagement driver is, in one embodiment, provided in the form of a linear actuator that has a first end coupled to the base, and a second end coupled to the engagement arrangement. The linear actuator is arranged to drive the engagement arrangement between the first and second positions. Moreover, it is decoupled from the engagement arrangement when the engagement arrangement is in the second position.

In this arrangement, an engagement coupler is interposed between the engagement arrangement and the engagement driver. The engagement coupler is provided with a support portion installed on the isolation support. First and second engagement arms are pivotally coupled to the support portion. Additionally, first and second articulated members coupled at a pivot point to one another and to the engagement driver, and are pivotally coupled at distal ends thereof to respective ones of the first and second engagement arms. In this manner, the engagement driver urges the pivot point along a predetermined path to a latching position beyond where the first and second articulated members are axially parallel. Such a latching effect is facilitated by a resilient biasing arrangement that is installed on at least one of the first and second engagement arms. The resilient biasing arrangement applies a resilient biasing force to the energy transfer system, which additionally maintains the engagement arrangement in the second position.

A displacement sensor is installed on at least one of the first and second engagement arms, and serves to produce a distance signal that is responsive to a distance between the one of the first and second engagement arms on which the displacement sensor is installed and the energy transfer system. In this manner, the distance signal is responsive to a predetermined dimension of the energy transfer system.

In a further embodiment, there is provided a thermal sensor for producing a thermal signal that is responsive to a temperature of the energy transfer system. The thermal sensor may be in the form of an infrared sensor that communicates optically with the energy transfer system. In one specific illustrative embodiment of the invention, the thermal sensor means has a directional characteristic and is directed to a predetermined region of the energy transfer system for determining a rate of change of temperature of the predetermined region with respect to time. In this embodiment, there is provided an acoustic sensor sensitivity control arrangement that is responsive to the thermal sensor for varying the amplitude of a noise signal in response to temperature. The variation of the amplitude of the noise signal with respect to temperature is performed in accordance with a non-linear amplitude-temperature relationship.

In accordance with a further apparatus aspect of the invention, there is provided an arrangement for isolating a mechanical drive system for a vehicle while it is subjected to a testing process, the drive system being of the type having a rotatory input and at least one rotatory output. IN accordance with the invention, the arrangement is provided with a base for supporting the arrangement and the mechanical drive system. An isolation support supports the mechanical drive system whereby the mechanical drive system is translatable in at least one plane of freedom with respect to the base. An engagement arrangement secures the mechanical drive system to the isolation support, the engagement arrangement having a first position with respect to the base wherein the mechanical drive system is installable on, and removable from, the isolation support, and a second position wherein the mechanical drive system is secured to the isolation support. An engagement driver is coupled to the base and to the engagement arrangement for urging the engagement arrangement between the first and second positions. The engagement arrangement is coupled to the engagement driver when the engagement arrangement is in the first position, and isolated from the engagement driver when the engagement arrangement is in the second position. In addition, a rotary drive applies a rotary drive force to the mechanical drive system, and a drive coupler transmits a torque from the rotary drive to the rotary input of the mechanical drive system.

In one embodiment of this further apparatus aspect of the invention, there is further provided a torque sensor interposed between the rotary drive and the mechanical drive system. The torque sensor produces a signal that is responsive to a torque applied by the rotary drive to the mechanical drive system. Preferably, the torque sensor is arranged to produce a static torque signal that is responsive to the magnitude of torque required to initiate rotary motion in the mechanical drive system. Additionally, the torque sensor produces a dynamic torque signal that is responsive to the magnitude of torque required to maintain rotary motion in the mechanical drive system.

In a further embodiment of the invention, the torque sensor is provided with a torque-transmitting element that has a predetermined deformation characteristic. The torque-transmitting element becomes deformed in response to the torque applied by the rotary drive system to the mechanical drive system. A strain sensor is coupled to the torque-transmitting element to produce a strain signal that is responsive to the predetermined deformation characteristic of the torque-transmitting element, and consequently, the applied torque.

In a further embodiment, there is provided a sensor that is arranged to communicate with the mechanical drive system for producing an information signal that is responsive to an operating characteristic of the mechanical drive system in response to the rotary drive force. A further sensor communicates with the mechanical drive system for producing a further information signal that is responsive to a further operating characteristic of the mechanical drive system in response to the rotary drive force. The operating characteristic and the further operating characteristic of the mechanical drive system correspond, in a highly advantageous embodiment of the invention, to drive and coast operating modes in response to a direction of torque of the rotary drive force. As previously stated, the sensor in one embodiment is arranged to be translatable between a first position distal from the mechanical drive system, and a second position where the sensor communicates with the mechanical drive system.

In this further apparatus aspect, the sensor may be provided with a microphone that is responsive to an acoustic energy issued by the mechanical drive system in response to the rotary drive force. In other embodiment, the sensor is provided with an accelerometer, or with a velocity sensor. In other embodiments, the sensor is installed on the engagement arrangement, and is translatable therewith between the respective first and second positions.

In some arrangements, the sensor is a non-contact sensor that produces a displacement signal that is responsive to displacement of the mechanical drive system in response to the rotary drive force. Such a non-contact sensor may be a laser sensor for communicating optically with the mechanical drive system. Additionally, the non-contact sensor produces a thermal signal that is responsive to a temperature of the mechanical drive system, such as an infrared sensor that communicates optically with the mechanical drive system. As previously noted, in one specific illustrative embodiment of the invention, the thermal sensor means has a directional characteristic and is directed to a predetermined region of the energy transfer system for determining a rate of change of temperature of the predetermined region with respect to time. In this embodiment, there is provided an acoustic sensor sensitivity control arrangement that is responsive to the thermal sensor for varying the amplitude of a noise signal in response to temperature. The variation of the amplitude of the noise signal with respect to temperature is performed in accordance with a non-linear amplitude-temperature relationship. The variation in temperature over time is useful to indicate low lubricant level, low lubricant quality, or low bearing quality.

In a further embodiment, the isolation support is provided with a resilient support element for supporting the mechanical drive system, and is provided with a resilience frequency characteristic that excludes a natural frequency of the mechanical drive system. Additionally, the resilience frequency characteristic of the resilient support element excludes a natural frequency of the drive coupler.

In a mechanical embodiment of the invention. there are additionally provided a rotary load for applying a rotary load to the mechanical drive system, and a load coupler for coupling the rotary load to the rotary input of the mechanical drive system. The mechanical drive system is in the form of a drive-transmitting component for a motor vehicle. In such an embodiment, the rotary load applies a controllable rotary load thereto to simulate a plurality of vehicle operating conditions. These include, for example, gear drive and coast conditions, as well as a gear float condition.

The engagement driver is provided, in one embodiment, with a linear actuator that has a first end coupled to the base, and a second end coupled to the engagement arrangement. An engagement coupler is interposed between the engagement arrangement and the engagement driver. The engagement coupler is provided with a support portion installed on the isolation support, and first and second engagement arms pivotally coupled to the support portion. Additionally, first and second articulated members are coupled at a pivot point to one another and to the linear actuator. They further are pivotally coupled at distal ends thereof to respective ones of the first and second engagement arms, whereby the linear actuator urges the pivot point along a linear path to a latching position beyond where the first and second articulated members are axially parallel. As previously noted, a resilient biasing arrangement that is installed on at least one of the first and second engagement arms applies a resilient biasing force to the energy transfer system. The resilient biasing arrangement applies a resilient biasing force that maintains the engagement arrangement in the second position.

In accordance with a method aspect of the invention, there is provided a method of testing a gear assembly of the type having an input and an output. The method includes the steps of:

installing the gear assembly on a mounting arrangement that resiliently permits motion of the gear assembly in all directions, and that has a resilient frequency characteristic that excludes all natural frequencies of the gear assembly;

applying a torque at the input of the gear assembly, whereby the gear assembly is rotatably operated;

applying a load at the output of the gear assembly; and sensing a predetermined operating characteristic of the gear assembly.

In one embodiment of this method aspect of the invention, the step of sensing is provided with the step of detecting acoustic energy issued by the gear assembly. Also, the step of detecting acoustic energy issued by the gear assembly is provided with the step of placing a microphone n the vicinity of the gear assembly.

In a further embodiment, the step of sensing is provided with the step of detecting vibratory displacement energy issued by the gear assembly. The step of detecting vibratory displacement energy issued by the gear assembly is provided with the further step of effecting communication between an accelerometer and the gear assembly, and the step of detecting vibratory displacement energy issued by the gear assembly is provided with the further step of effecting communication between a velocity sensor and the gear assembly.

After performing the step installing there is further provided the step of clamping the gear assembly to the mounting arrangement. In an embodiment where the mounting arrangement is installed on a reference base portion, the step of clamping is performed in response to the further step of applying a clamping actuation force to a clamping arrangement with respect to the reference base portion. A clamping actuation force is applied, and the gear arrangement is enabled to move freely independent of the reference base portion.

In a further embodiment, the step of applying a clamping force is provided with the further step of applying a resilient clamping force to the gear assembly. This step may, in certain embodiments, include the further step of monitoring a predetermined dimension of the gear assembly in response to the step of clamping. This is accomplished by use of a sensor that measures distance traveled.

Sensing is effected by monitoring a first sensor that receives acoustic energy that is responsive to a qualitative condition of the gear assembly in a drive mode of operation. When the drive mode of operation is in a first direction of operation, the qualitative condition of the gear assembly in the drive mode of operation includes a qualitative condition of a first surface of the teeth of the gear assembly. Also when drive mode of operation is in a first direction of operation, the qualitative condition of the gear assembly in the drive mode of operation includes a qualitative condition of a profile of a gear of the gear assembly, and a qualitative condition of the eccentricity of a gear of the gear assembly. Additionally, the qualitative condition of the gear assembly in the drive mode of operation includes a qualitative condition of the angular orientation of the gears of the gear assembly. In still further embodiments of the method aspect of the invention, wherein the drive mode of operation is in a first direction of operation, the qualitative condition of the gear assembly in the drive mode of operation includes a qualitative condition of a plurality of moving components of the gear assembly.

In a further embodiment of the invention, the step of sensing is provided with the further step of monitoring a second sensor that receives acoustic energy that is responsive to a qualitative condition of the gear assembly in a coast mode of operation. The coast mode of operation includes a qualitative condition of a second surface of the teeth of the gear assembly. When the coast mode of operation is in a first direction of operation, the qualitative condition of the gear assembly in the coast mode of operation includes a qualitative condition of a profile of a gear of the gear assembly. Additionally, the qualitative condition of the gear assembly in the coast mode of operation includes a qualitative condition of the eccentricity of a gear of the gear assembly, as well as the angular orientation of the gears of the gear assembly. In further embodiments, the coast mode of operation includes a qualitative condition of a plurality of moving components of the gear assembly.

In accordance with a further embodiment of this method aspect of the invention, the drive and coast modes of operation are cyclical over a period that is shorter than a cycle period of the input of the gear assembly. Conversely, the period can be longer than a cycle period of the input of the gear assembly. This will depend, to an extent, upon the operating ratios within the system under test. In situations where the system under test is an electrical system, harmonics and signal distortions may affect the apparent cycle period in relation to the cycle period of the input energy.

In an advantageous embodiment, the first and second sensors are disposed at respective locations that are distal from each other, with the gear assembly interposed therebetween. This enables distinguishing between operating modalities of the system under test, as well as facilitating analysis of operating characteristics of the system under test that have directional components.

In accordance with a clamping aspect of the present invention, there is provided an arrangement for clamping a workpiece to a resilient support element. In this aspect of the invention, there is provided a support base installed on the resilient support element. First and second clamping arms are each coupled to the support base by a respective first pivot coupling and arranged to rotate pivotally about the respective first pivot couplings between respective clamped and released counter rotational positions. Each of the first and second clamping arms is further provided with a respective second pivot coupling. First and second links are included in the combination, each having a respective central axis between a respective first pivot coupling where the first and second links are pivotally coupled to one another, and respective second pivot couplings where each of the first and second links is coupled to a second pivot coupling of a respectively associated one of the first and second clamping arms. A drive arrangement urges the first and second links from a first angulated link position corresponding to the released counter rotational position of the first and second clamping arms to a second angulated link position on the other side of a coaxial position of the first and second links, the second angulated link position corresponding to the clamped counter rotational position of the first and second clamping arms. Also, a drive coupler is arranged to couple drive arrangement to at least one of the first and second links whereby the drive arrangement is decoupled from the first and second links when the links are in the second angulated link position.

In one embodiment of the clamping aspect of the invention, the drive coupler is coupled to the first pivot couplings of the first and second links. In an embodiment where the workpiece has a vibratory displacement characteristic, the clamping arrangement is substantially freely displaceable in response to the vibratory displacement characteristic of the workpiece while the first and second links are in the second angulated link position.

A sensor is installed on at least one of the first and second clamping arms for detecting a predetermined operating characteristic of the workpiece. The may detect a displacement of the workpiece, or an acoustical energy issued by the workpiece.

In an embodiment where the workpiece is a gear assembly having a rotatory input and an output, there is additionally provided a rotatory drive for applying a torque at the rotatory input of the gear assembly. Also, a drive coupler couples the rotatory drive to the rotatory input of the gear assembly. The drive coupler is arranged to provide substantially exclusively torque to the gear assembly at its rotatory input, without any substantial axial loading, and to attenuate the propagation of acoustic energy from the rotatory drive arrangement. A load is coupled to the output of the gear assembly, the load being arranged to simulate an actual operating condition of the gear assembly.

In accordance with a drive coupling aspect of the invention, substantially exclusively torque is transmitted from a drive arrangement to a gear assembly under test. The drive coupling arrangement includes a first coupler portion attached to the drive coupling arrangement, the coupler having a polygonal cross-sectional configuration that extends continuously over a predetermined length of axis. The polygonal cross-sectional configuration has a plurality of substantially planar surfaces that extend parallel to the predetermined length of axis. A second coupler portion is provided and has an internal cross-sectional configuration that accommodates the polygonal cross-sectional configuration of said first coupler portion. The second coupler portion is provided with a plurality of engagement portions that communicate exclusively with a predetermined number of the substantially planar surfaces of said first coupler portion. The first and second coupler portions are axially translatable along said first coupler portion for a portion of the predetermined length of axis. Therefore, the torque is transmitted between the first and second coupler portions without exerting an axial load.

In one embodiment of this drive coupling aspect of the invention, the polygonal cross-sectional configuration corresponds to a hexagon. Also, the second coupler portion has three engagement portions that engage three respective planar surfaces of the first coupler portion.

In accordance with a further method aspect of the invention, there is provided a method of signal analysis for processing information from a gear system under test. This further method aspect includes the steps of:

driving the gear system under test by application of a rotatory input;

producing a first signal responsive to the torque applied to the gear system under test;

producing first digital data responsive to a first correlation between the first signal and time;

measuring peaks in said first digital data to determine whether the peaks exceeds a predetermined threshold magnitude; and first subjecting those of the peaks that exceed the predetermined threshold magnitude to harmonic analysis.

In a specific illustrative embodiment of the invention of this further method aspect, there is provided the further step of comparing the result of the harmonic analysis of the step of first subjecting against gear tooth harmonics to determine whether the peaks constitute an anomaly. Such an anomaly is a bump or a nick on a tooth of the gear system under test.

In a highly advantageous embodiment of the invention wherein improved results are obtained, there are provided the further steps of:

producing a second signal responsive to a noise produced by the gear system under test in response to the step of driving;

producing a second digital data responsive to a second correlation between the second signal and time;

identifying peaks in the second digital data that are simultaneous with peaks in said first digital data;

measuring the simultaneous peaks in the second digital data to determine whether they exceed a second predetermined threshold magnitude; and second subjecting those of the simultaneous peaks in the second digital data that exceed the second predetermined threshold magnitude to harmonic analysis.

As is the case in the embodiment where only the torque signal is subjected to harmonic analysis, there is additionally provided in this embodiment the further step of comparing the result of the harmonic analysis of the steps of first subjecting and second subjecting against gear tooth harmonics to determine whether the simultaneous peaks constitute an anomaly. Thus, in this embodiment, the torque and the noise signals are subjected to harmonic analysis. It is desired in an embodiment of the invention that is used to test gear systems, to determine whether the anomaly is a bump or a nick on a tooth of the gear system under test. In a further step of calculating, the severity of the anomaly determined in the step of comparing is determined.

In a still further embodiment of this method aspect, there are provided the further steps of:

establishing predetermined harmonic criteria; and determining whether the results of the analysis in the step of subjecting conforms to the predetermined harmonic criterial of the step of establishing.

In accordance with a still further method aspect of the invention, there is provided a method of signal analysis for processing information from a gear system under test for determining the presence of bumps or nicks therein. In this still further method aspect, there are provided the steps of:

driving the gear system under test by application of a rotatory input;

producing a first signal responsive to the torque applied the gear system under test;

producing a second signal responsive to a noise produced by the gear system under test in response to the step of driving;

producing first digital data responsive to a first correlation between the first signal and time;

producing a second digital data responsive to a second correlation between the second signal and time;

identifying simultaneous peaks in the first and second digital data;

measuring the simultaneous peaks in the first and second digital data to determine whether they exceed a predetermined threshold magnitude; and subjecting those of the simultaneous peaks that exceed the predetermined threshold magnitude to harmonic analysis.

In one embodiment of this method aspect, there is provided the further step of comparing the result of the harmonic analysis of the step of subjecting against gear tooth harmonics to determine whether the simultaneous peaks constitute an anomaly. In a further embodiment, there is provided the further step of calculating the severity of the anomaly of the step of comparing.

BRIEF DESCRIPTION OF THE DRAWING

Comprehension of the invention is facilitated by reading the following detailed description, in conjunction with the annexed drawing, in which:

FIG. 3 is an exploded plan representation of the embodiment of FIG. 1 showing certain drive components;

DETAILED DESCRIPTION

Figure 1:
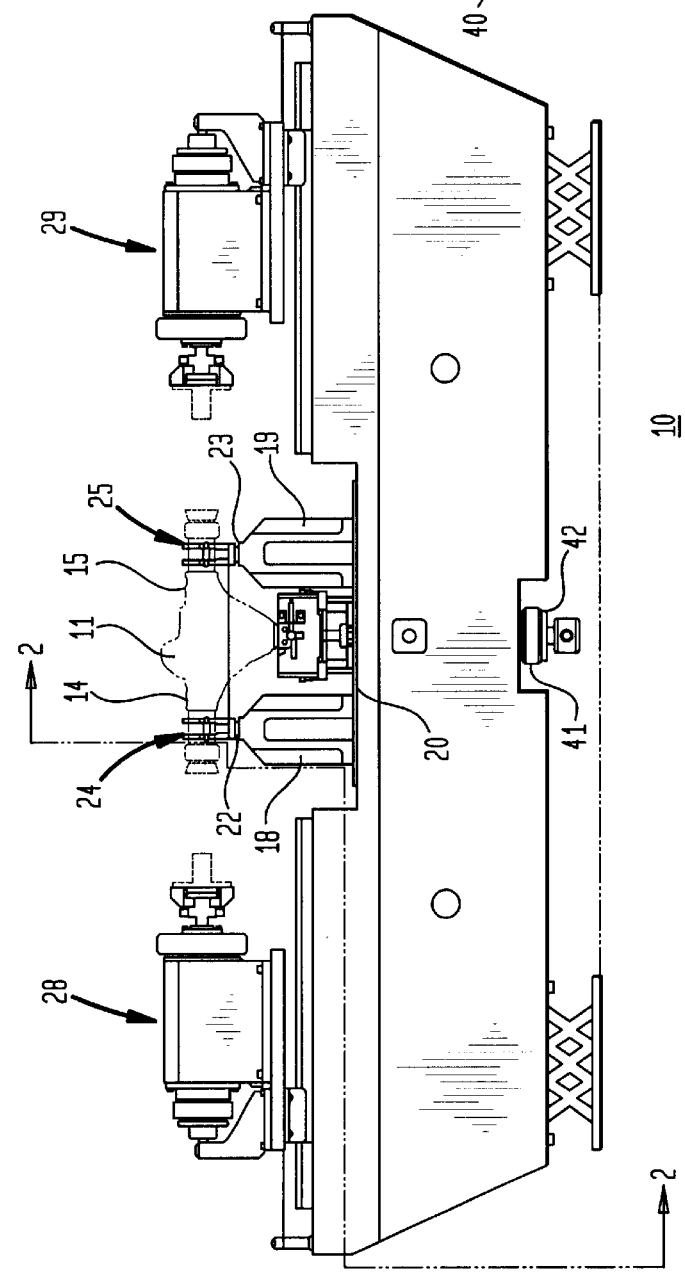
FIG. 1 is a front plan representation of an arrangement for isolating a system under test, constructed in accordance with the principles of the invention.

FIG. 1 is a front plan representation of an arrangement for isolating a system under test, constructed in accordance with the principles of the invention. As shown in this figure, an isolating arrangement 10 is arranged to support in relative isolation a mechanical drive system in the form of a differential 11. Differential 11 is of the type that is conventionally employed in a motor vehicle (not shown) and is intended to be tested for a variety of operating conditions, using isolating arrangement 10. The differential is of the type having a rotatory input 13 that receives rotatory mechanical energy from a drive arrangement (not shown in this figure) that will be described below. In addition, differential 11 has rotatory outputs 14 and 15, respectively, that produce rotatory mechanical energy in response to the rotatory input energy received at rotatory input 13. When employed in a motor vehicle (not shown), differential 11 is coupled to the drive shaft (not shown) of the vehicle at rotatory input 13, and rotatory outputs 14 and 15 are coupled to the vehicle's drive wheels (not shown).

Differential 11 is shown to be supported on a pair of supports 18 and 19 that are installed on a base 20. Each of supports 18 and 19 has installed thereon a respectively associated one of resilient isolating elements 22 and 23. A respective one of engagement arrangements 24 and 25 are installed on resilient isolating elements 22 and 23. The engagement arrangements will be described in detail hereinbelow and serve to couple differential 1 1 at its rotatory outputs 14 and 15 whereby it is secured with respect to base 20, yet limited motion of differential 11 is permitted relative to base 20.

FIG. 1 further shows a pair of load arrangements 28 and 29 that apply a controllable load to respectively associated ones of rotatory outputs 14 and 15. The rotatory outputs are coupled mechanically (coupling not shown in this figure) to load arrangements 28 and 29 in a manner that facilitates limited motion of the rotatory outputs with respect to base 20. The permissible displacement of differential 11 in accordance with the present invention is along multiple planes of freedom, and, as will be described hereinbelow, the coupling arrangements (not shown in this figure, between rotatory outputs 14 and 15 and their respective associated load arrangements 28 and 29 permit axial and rotative degrees of freedom of motion. Such couplings will be described with respect to FIGS. 9–12.

Figure 2:
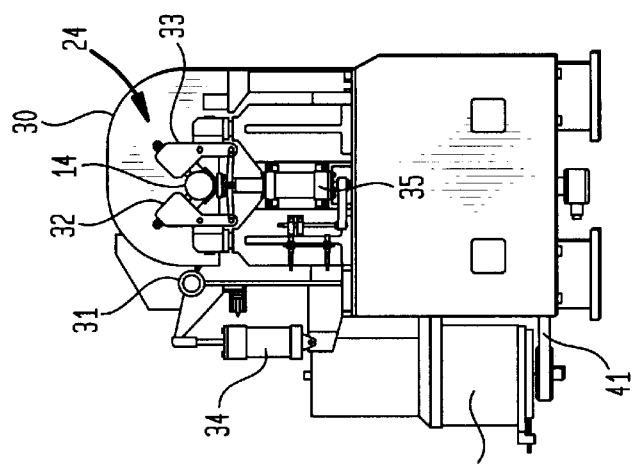
FIG. 2 is a side plan view of the embodiment of FIG. 1.

FIG. 2 is a side plan view of the embodiment of FIG. 1. This figure is taken along line 2—2 of FIG. 1. In addition to some of the structure shown in FIG. 1, FIG. 2 shows a safety cover 30 that protects the user (not shown) of the isolating arrangement in accordance with established safety standards. Elements of structure that correspond to those discussed hereinabove with respect to FIG. 1 are similarly designated.

FIG. 2 shows engagement arrangement 24 having engagement arms 32 and 33 that are shown in an engaged position around rotatory output 14. As will be described hereinbelow, engagement arms 32 and 33 have engaged and disengaged (not shown) positions in response to actuation of an engagement driver which is shown in. this figure in the form of a linear actuator 35.

A safety cover 30 is shown to be coupled to a cover hinge 31, whereby the safety cover is rotatable thereabout in response to actuation of a cover actuator 34. In operation, the safety cover is arranged in the position shown in the figure during performance of the testing procedure, and it is raised to a position that is not shown in order to facilitate installation and removal of the system under test, i.e., differential 11.

FIG. 2 additionally shows a drive motor 40, which in this embodiment, is coupled to a belt pulley 42, shown in FIG. 1.

FIG. 3 is an exploded plan representation of the embodiment of FIG. 1 showing certain drive components. Elements of structure that have previously been discussed are similarly designated. The drive arrangement, and the manner by which it is coupled to differential 11, will be discussed in detail hereinbelow with respect to FIGS. 5–8.

Figure 4:
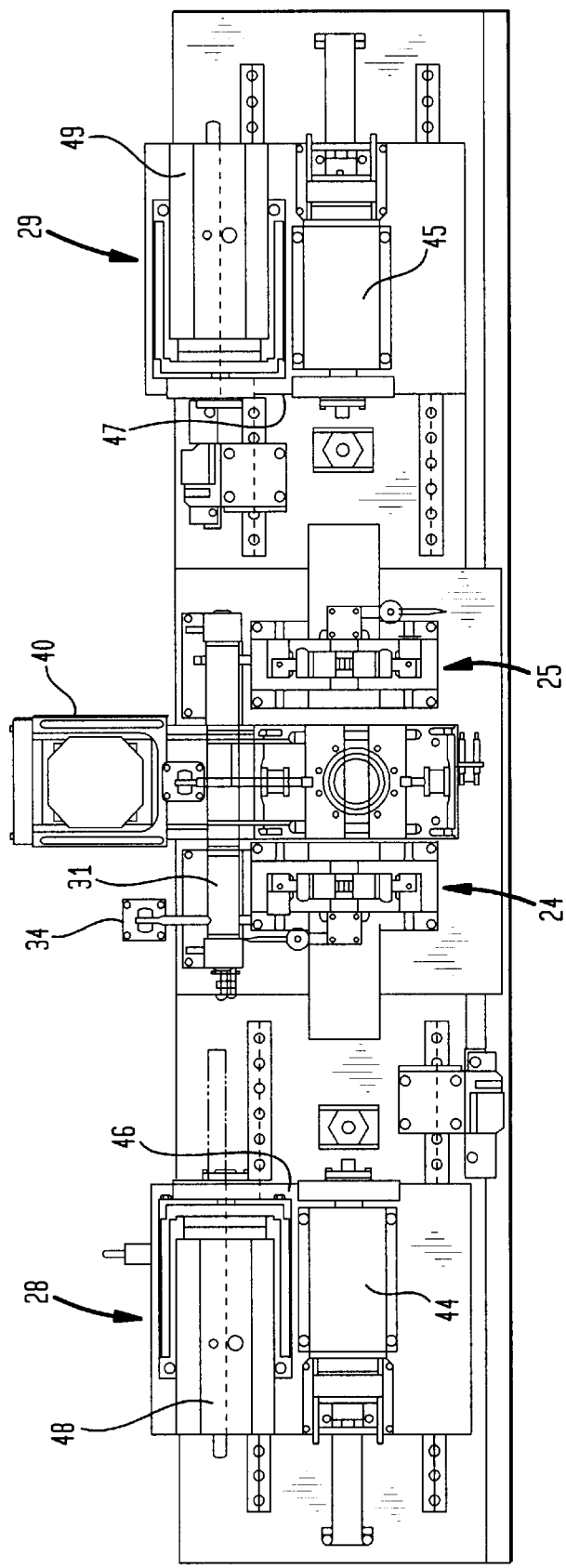
FIG. 4 is a top plan view of the embodiment of FIG. 1.

FIG. 4 is a top plan view of the embodiment of FIG. 1. Elements of structure that have previously been discussed are similarly designated. Moreover, differential 11 has been removed, and therefore, is not visible in this figure.

In FIG. 4, each of load arrangements 28 and 29 has associated therewith a respective one of load coupler arrangements 44 and 45, each of which is coupled by a respective load belt 46 and 47 to a respective one of load units 48 and 49. Load arrangement 28 will be described in detail hereinbelow with respect to FIG. 11, and the load coupler arrangements, 44 and 45, will be described in detail with respect to FIG. 12. Referring to FIG. 4, rotatory outputs 14 and 15 (not shown in this figure) are coupled (coupling not shown in this figure) to respectively associated ones of load coupler arrangements 44 and 45 which, as previously noted, provide multiple degrees of freedom of movement. Load units 48 and 49, in this specific illustrative embodiment of the invention, are in the form of electric brakes or electric motors. Of course, other forms of loads can be employed in the practice of the invention. In embodiments of the invention where the load units are in the form of electric motors, such motors can provide simulated braking and driving operations. Thus, in the present embodiment where the isolating arrangement is directed to the testing of a drive component for a vehicle, such as a differential, the load units can be operated in a drag, or generator mode, wherein the differential would be operated in a simulated drive mode. That is, the load is driven by the differential. Alternatively, the load units can be operated in a motor drive mode, wherein the differential is itself driven by the load, i.e., operated in a simulated coast mode. In a highly advantageous embodiment of the invention, the differential can be operated and thereby tested in drive and coast modes of operation in forward and reverse directions. It is to be remembered that during drive and coast modes of operation different gear tooth surfaces (not shown) within the differential are caused to communicate with one another, thereby affording enhanced testing capability.

Figure 5:
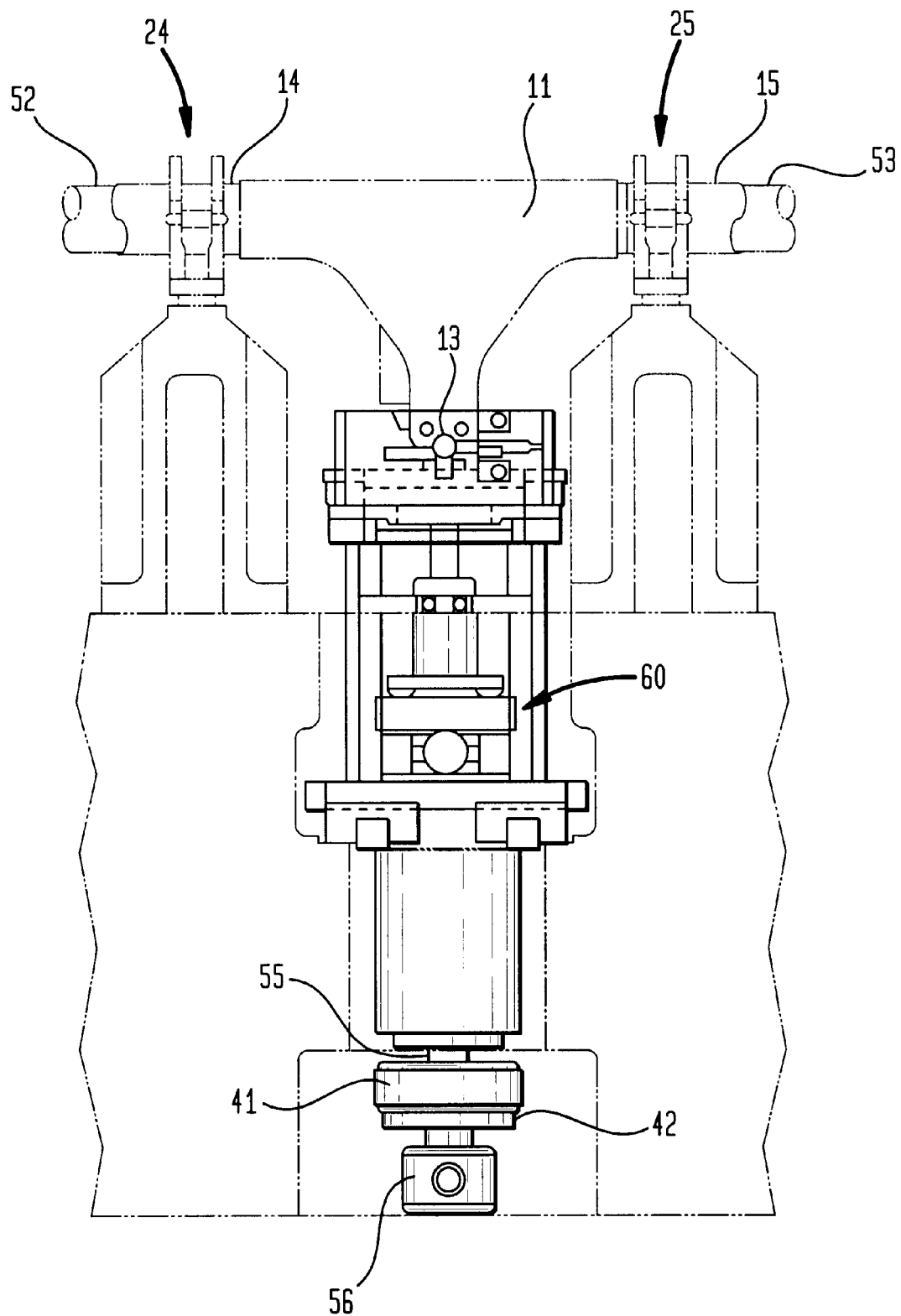
FIG. 5 is a partially phantom front plan view of a drive arrangement that supplied rotatory mechanical energy to an isolate mechanical energy transfer system under test.

FIG. 5 is a partially phantom front plan view of a drive arrangement that supplies rotatory mechanical energy to an isolated mechanical energy transfer system under test. Elements of structure that have previously been discussed are similarly designated. As shown in this figure, output shafts 52 and 53 are shown protruding from the fragmented representation of rotatory outputs 14 and 15, respectively. The output shafts rotate in response to the application of a rotatory drive at rotatory input 13.

Figure 6:
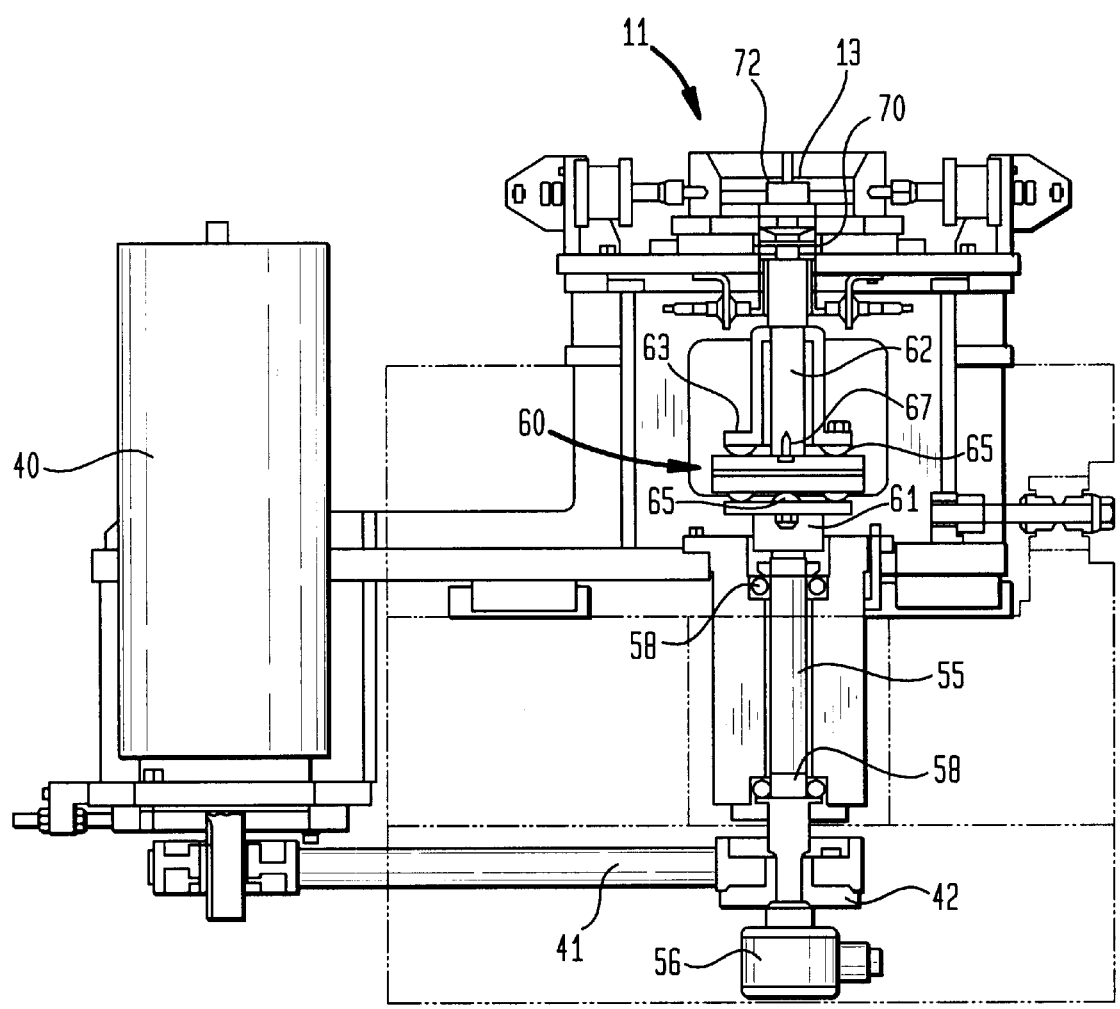
FIG. 6 is side plan view of the drive system of FIG. 5.

FIG. 6 is side plan view of the drive system of FIG. 5. The operation of the drive arrangement that will supply a rotatory drive to rotatory input 13 of differential 11 is described herein with reference to FIGS. 5–9. As stated, drive motor 40 is coupled via a drive belt 41 to belt pulley 42 which is installed on a drive shaft 55 that is shown in the figures to extend axially vertically. Belt pulley 42 contains a torque sensing arrangement (not shown) that provides an electrical signal responsive to torque differential between the belt pulley and drive shaft 55. The electrical signal responsive to torque (not shown) is available at signal output connector 56.

In this specific illustrative embodiment of the invention, the torque sensing arrangement contained within belt pulley 42 and its associated signal output connector 56 is in the form of a strain gauge (not shown) installed to respond to the displacement of a web (not shown). That is, in the practice of this aspect of the invention, torque is transmitted across a web whereby, for example the torque is applied across the periphery of the web, and an output shaft is coupled nearer to the center of the web. Of course, these may be reversed. As torque is applied, the web is correspondingly deformed, and a strain gauge installed on the web measures the deformity in the web in response to the applied torque. Over a predetermined range of torque, the deformation of the web, as determined by the strain gauge, can be correlated to the magnitude of the applied torque. Signal output connector 56, in this specific illustrative embodiment of the invention, additionally contains circuitry (not shown) that is AC coupled to the torque sensing arrangement, and that modulates and demodulates the resulting torque signal.

Shaft 55 is shown in FIG. 6 to be supported against axially transverse motion by a pair of journal bearings 58. Drive shaft 55, therefore, rotates about its axis in response to a rotatory drive energy supplied by drive motor 40 and delivered thereto by drive belt 41.

A coupling arrangement 60 that is fixed axially onto drive shaft 55 permits resilient axial displacement of a coupling shaft 62 with respect to the axis of drive shaft 55. Coupling arrangement 60 is formed of a flanged member 61 that is coupled to rotate with drive shaft 55. A further flanged member 63 is shown to be engaged with coupling shaft 62. Flanged members 61 and 63 are each provided with respective resilient elements 65 that facilitate the permissible axial displacement of coupling shaft 62 with respect to the central axis defined by drive shaft 55. The rotatory energy is transmitted across intermediate element 67, with which resilient elements 65 communicate.

Figure 7:
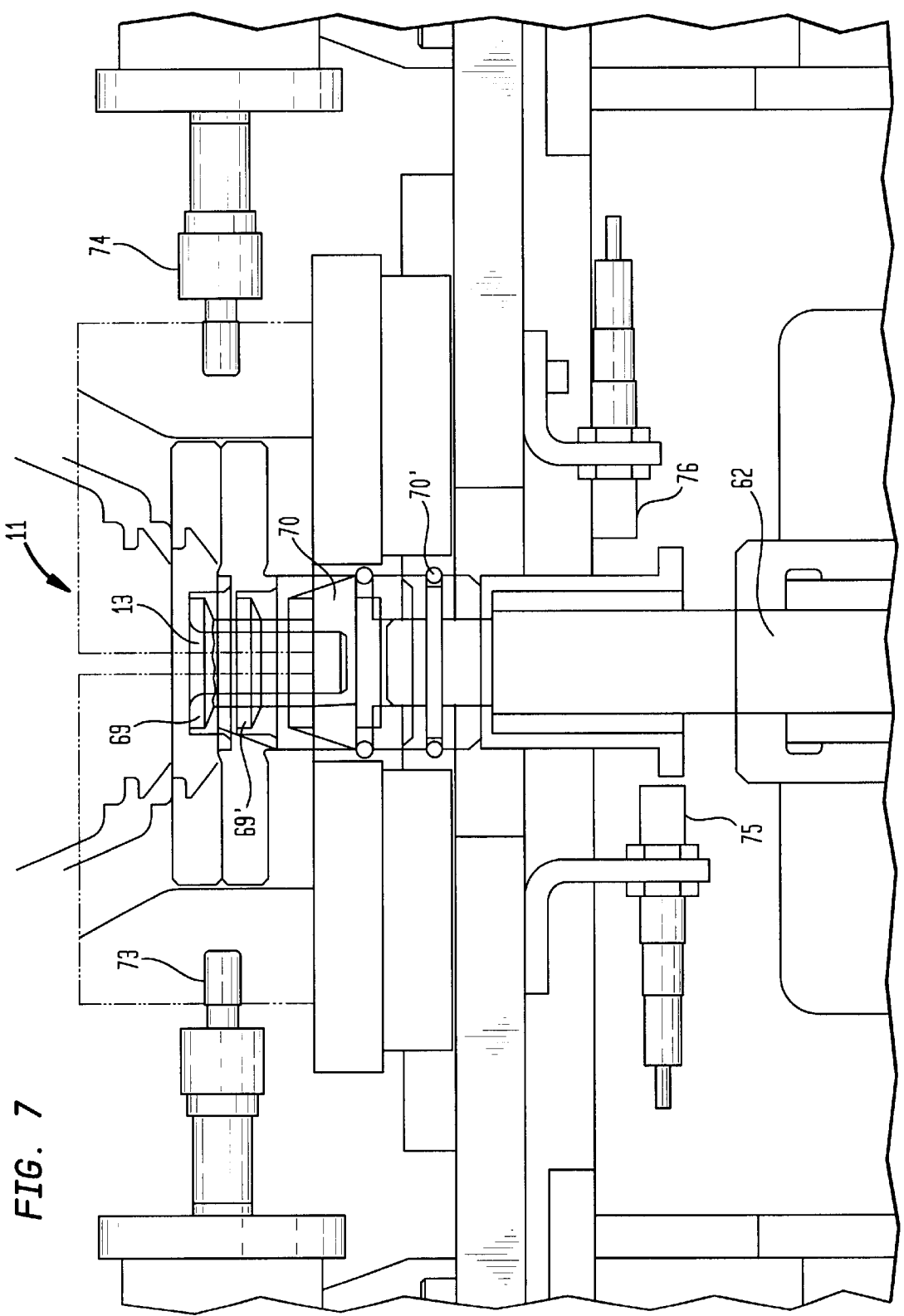
FIG. 7 is a side plan representation of the drive system as shown in FIG. 6, enlarged to show greater detail.

FIG. 7 is a side plan representation of the drive system as shown in FIG. 6, enlarged to show greater detail. As shown in FIGS. 6 and 7, the uppermost end of coupling shaft 62 is arranged to be connected to rotatory input 13 of differential 11 (shown in fragmented form in these figures). Differential 11 is of the conventional type having an hexagonal nut 69 (FIG. 7) installed at rotatory input 13. Rotatory input 13 is formed as a pinion shaft, and hexagonal nut 13 is threadedly engaged therewith. The application of a high tightening torque to hexagonal nut 13 during assembly of the differential prevents same from loosening during application of the rotatory energy via coupling shaft 62.

FIG. 7 shows differential 11 in the process of being installed onto coupling shaft 62, and therefore hexagonal nut 69 is shown in two positions, where it is designated 69 and 69', respectively. Upon completion of the installation of differential 11, hexagonal nut 69 becomes engaged with a nut driver 70. Nut driver 70 is axially translatable, and therefore is shown in two positions, where it is designated 70 and 70'.

Figure 8:
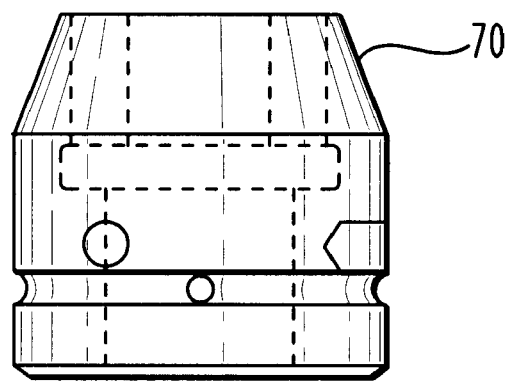
FIG. 8 is a side plan view of a coupler that couples the drive system to the mechanical system under test.
Figure 9:
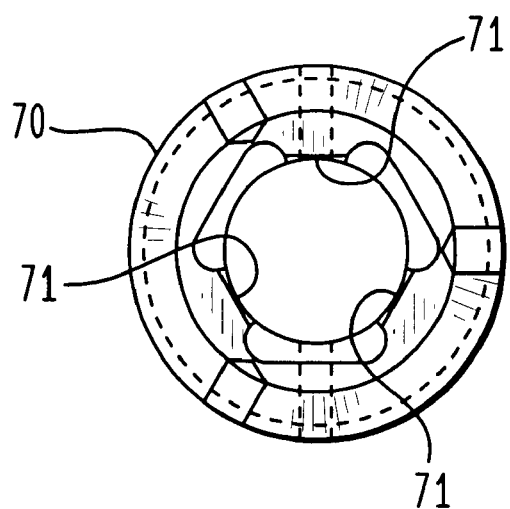
FIG. 9 is a top plan view of the coupler of FIG. 8 showing therein three engagement surfaces for coupling with the flanks of an hexagonal nut (not shown in this figure) at the rotatory input of the mechanical system under test.

FIG. 8 is a side plan view of nut driver 70 that couples the drive system to the mechanical system under test. FIG. 9 is a top plan view of nut driver 70 of FIG. 8 showing therein three engagement surfaces for coupling with the flanks of an hexagonal nut (not shown in this figure) at the rotatory input of the mechanical system under test. As shown in FIG. 8 and FIG. 9, nut driver 70 has a tapered outward appearance when viewed from the side (FIG. 8). Internally, nut driver 70 is provided with three engagement surfaces 71. The engagement surfaces engage with the flank surfaces of the nut (not shown) at rotatory input 13 of differential 11. The nut driver is, as previously noted, axially displaceable along the axis of coupling shaft 62, and is urged upward toward the nut at the rotatory input of the differential by operation of a resilient spring member 72 (FIG. 6). Thus, the nut driver is urged into communication with the nut by operation of the light resilient bias supplied by spring 72, thereby ensuring engagement between nut driver 70 and the hexagonal nut (not shown in FIGS. 8 and 9) at the rotatory input of differential 11. It is to be noted that the light axial bias applied by the engagement spring is negligible and affords the differential a degree of freedom of movement in the axial direction.

Referring once again to FIG. 7, sensors 73–76 are shown for monitoring various aspects of the operation of the differential in response to the application of the rotatory input. For example, in one embodiment of the invention, the various sensors are configured to monitor angular position of the rotatory input, transaxial displacement of the drive shaft, transaxial displacement of the differential in response to the application of the rotatory input energy, temperature in the region of the input bearing (not shown) of the differential, acoustic noise, etc.

Figure 10:
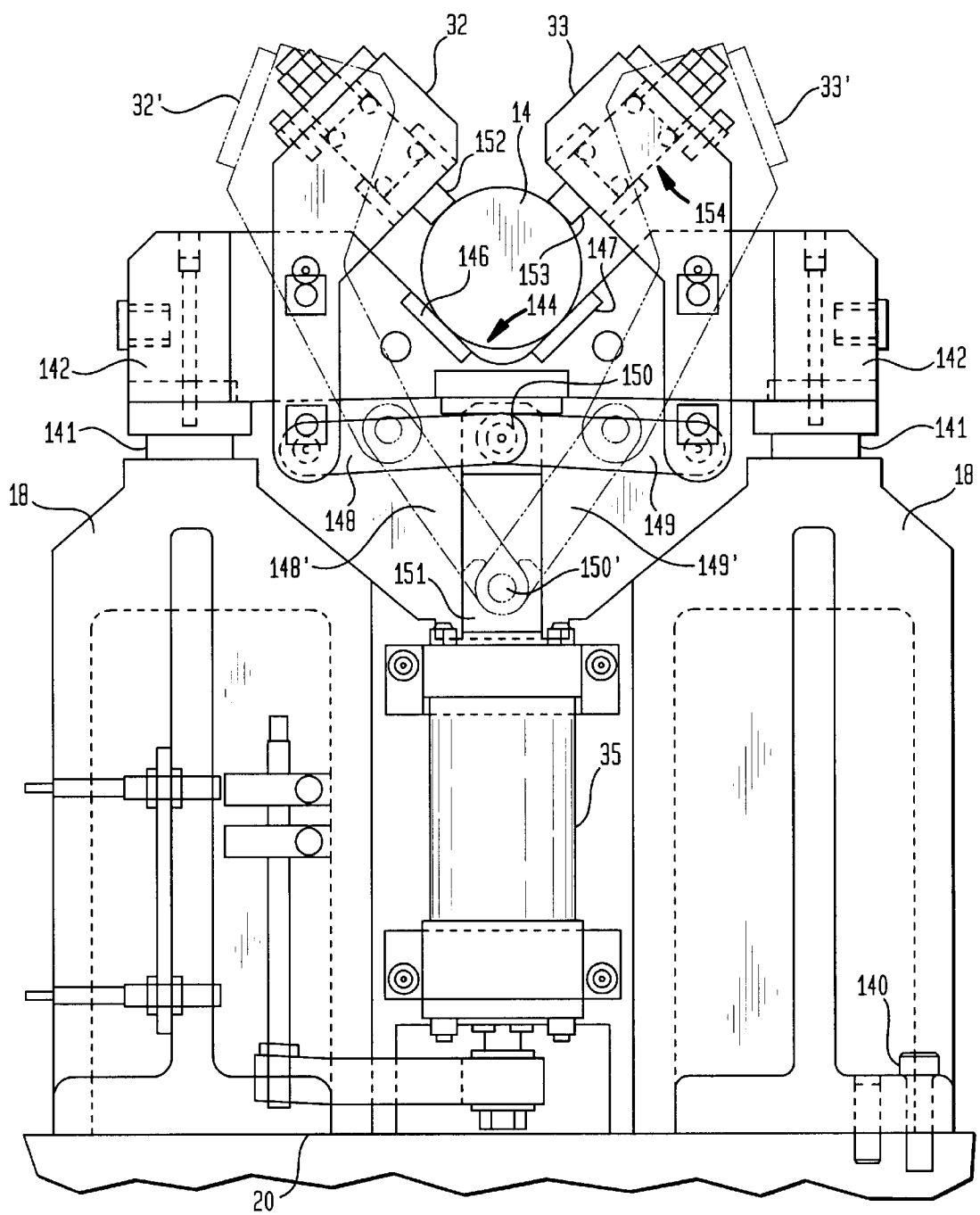
FIG. 10 is a plan representation of a clamping arrangement constructed in accordance with the principles of the invention, the clamping arrangement being shown in two positions.

FIG. 10 is a plan representation of a clamping arrangement constructed in accordance with the principles of the invention, the clamping arrangement being shown in two positions. Elements of structure that correspond to those previously described are similarly designated. As shown, support 18 is coupled to base 20, illustratively via one or more fasteners 140. In this embodiment, a pair of resilient support elements 141 are disposed on support element 18 and there is supported thereon an isolation support 142. The isolation support has a central V-shaped region 144 in the vicinity of which are installed support bearings 146 and 147. Rotatory output 14 of differential 11 (not shown in this figure) rests on the support bearings.

Engagement arms 32 and 33, as previously noted, have first and second positions corresponding to open and closed conditions. Engagement arms 32 and 33 are shown in the closed condition, wherein rotatory output 14 is clamped to support bearings 146 and 147. When the support arms are in the open position, identified as 32' and 33' (shown in phantom), the differential can be removed or installed onto isolation support 142. Actuation of the engagement arms between the open and closed conditions is effected by operation of linear actuator 35 which is coupled to the engagement arms by respectively associated ones of engagement coupler links 148 and 149. Engagement coupler links 148 and 149 are each coupled at a respective first ends thereof to a respectively associated one of engagement arms 32 and 33, and they each are coupled to one another at a central pivot coupling 150. An armature 151 of linear actuator 35 travels vertically to effect clamping and release of rotatory output 14.

When armature 151 is extended upward, engagement arms 32 and 33 are urged toward rotatory output 14, whereby spring-loaded contacts 152 and 153 communicate with rotatory output 14. In this embodiment, the spring-loaded contacts exert a resilient biased force against rotatory output 14 facilitating the latching of the engagement arms by operation of armature 151. As shown, when the armature is extended fully upward, engagement coupler links 148 and 149 are urged beyond the point where their respective axes are parallel, and therefore, the engagement coupler links are biased against the underside of isolation support 142. It should be noted that the pivot pin (not specifically shown) coupled to armature 151 at pivot coupling 150 has a smaller diameter than the apertures in the engagement coupler links. Thus, during testing of the vibration and noise of the differential, armature 151 of linear actuator 35 is essentially decoupled from engagement coupler links 148 and 149 and isolation support 142.

When it is desired to remove differential 11 from isolating arrangement 10, armature 151 is withdrawn, whereupon pivot coupling 150 is translated to the location identified as 150'. In this position, the engagement arms are translated to the location shown in phantom as 32' and 33'.

In a further embodiment of the invention, one or both of spring-loaded contacts 152 and 153 is provided with a displacements sensor 154 that produces an electrical signal, or other indication, responsive to the extent of inward translation of the spring-loaded contact. Such an indication would be responsive to the outside dimension of the rotatory output of differential 11, thereby providing a means for determining dimensional variations of the differential housing (not specifically identified in this figure) during a production run.

Figure 11:
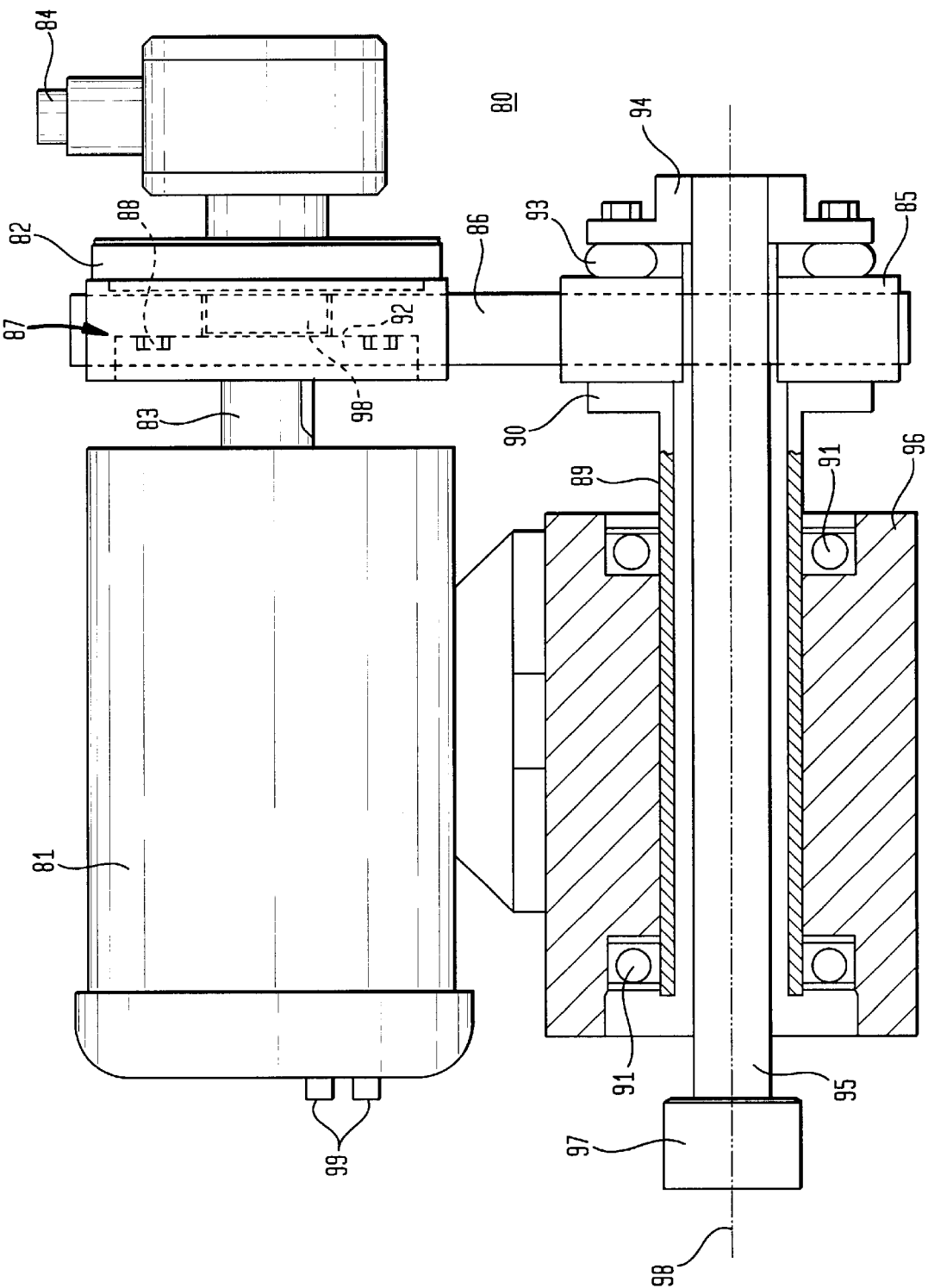
FIG. 11 is a compact drive arrangement constructed in accordance with the invention for coupling the rotatory output of a mechanical energy transfer system under test to a rotatory load.

FIG. 11 is a compact drive arrangement constructed in accordance with the invention for coupling the rotatory output of a mechanical energy transfer system under test (not shown in this figure) to a rotatory load, which will be described hereinbelow in the form of an electric rotatory device that is operable in drive and generator modes. As shown in this figure, a load arrangement 80 is provided with a load motor 81 having a belt pulley 82 arranged to rotate with a load motor shaft 83.

In this specific embodiment, pulley 82 is coupled to a further belt pulley 85 via a load belt 86. Pulley 85 is coupled to a tubular shaft 89 having a flanged portion 90 that is arranged in axial communication with tubular shaft 89. In a manner similar to that of pulley 46 in FIG. 6, belt pulley 82 in FIG. 11 contains a torque sensing arrangement 87 that provides an electrical signal (not shown) responsive to a torque differential between the belt pulley and load motor shaft 83. The electrical signal responsive to torque is available at signal output connector 84, as described below.

In this specific illustrative embodiment of the invention, torque sensing arrangement 87 contained within belt pulley 82 and its associated signal output connector 84 include a strain gauge 88 installed to respond to the displacement of a web 92. That is, in the practice of this aspect of the invention, torque is transmitted across web 92 wherein, for example, the torque is applied across the periphery of the web, and an output shaft 98 is coupled nearer to the center of the web. Of course, the application of the torque may be rotationally reversed. As the torque is applied, web 92 is correspondingly deformed, and strain gauge 88 installed on the web measures the deformity in the web in response to the applied torque. Over a predetermined range of torque, the deformation of web 92, as determined by measurement of the electrical response of strain gauge 88 at signal output connector 84, can be correlated to the magnitude of the applied torque.

As described hereinabove with respect to signal output connector 56 in FIG. 6, in this specific illustrative embodiment of the invention, signal output connector 84 in FIG. 11 additionally contains circuitry (not shown) that is AC coupled to the torque sensing arrangement, and that modulates and demodulates the resulting torque signal. The torque signal will be to a significant extent responsive to the load or drive characteristic of load motor 81, which is controllable by the application of appropriate electrical signals (not shown) or connection of electrical loads (not shown) at electrical terminals 99 thereof.

Tubular shaft 89 is supported rotatably by ball bearings 91. On the other side of pulley 85 is arranged a resilient element 93 that is secured to remain in communication with pulley 85 by operation of an end cap 94. End cap 94 has internally affixed thereto a load shaft 95 that is arranged to extend along the interior length of tubular shaft 89. Thus, notwithstanding that tubular shaft 89 is axially fixed in a support 96, load shaft 95 will rotate with the tubular shaft but can experience displacement transverse to axis of rotation 98. Thus, any rotatory element (not shown in this figure) that would be coupled to load shaft 95 at its associated coupler 97 would be provided with freedom of motion in any direction transverse to the axis of rotation of the load shaft, and therefore would not be constrained in the axially transverse direction.

Figure 12:
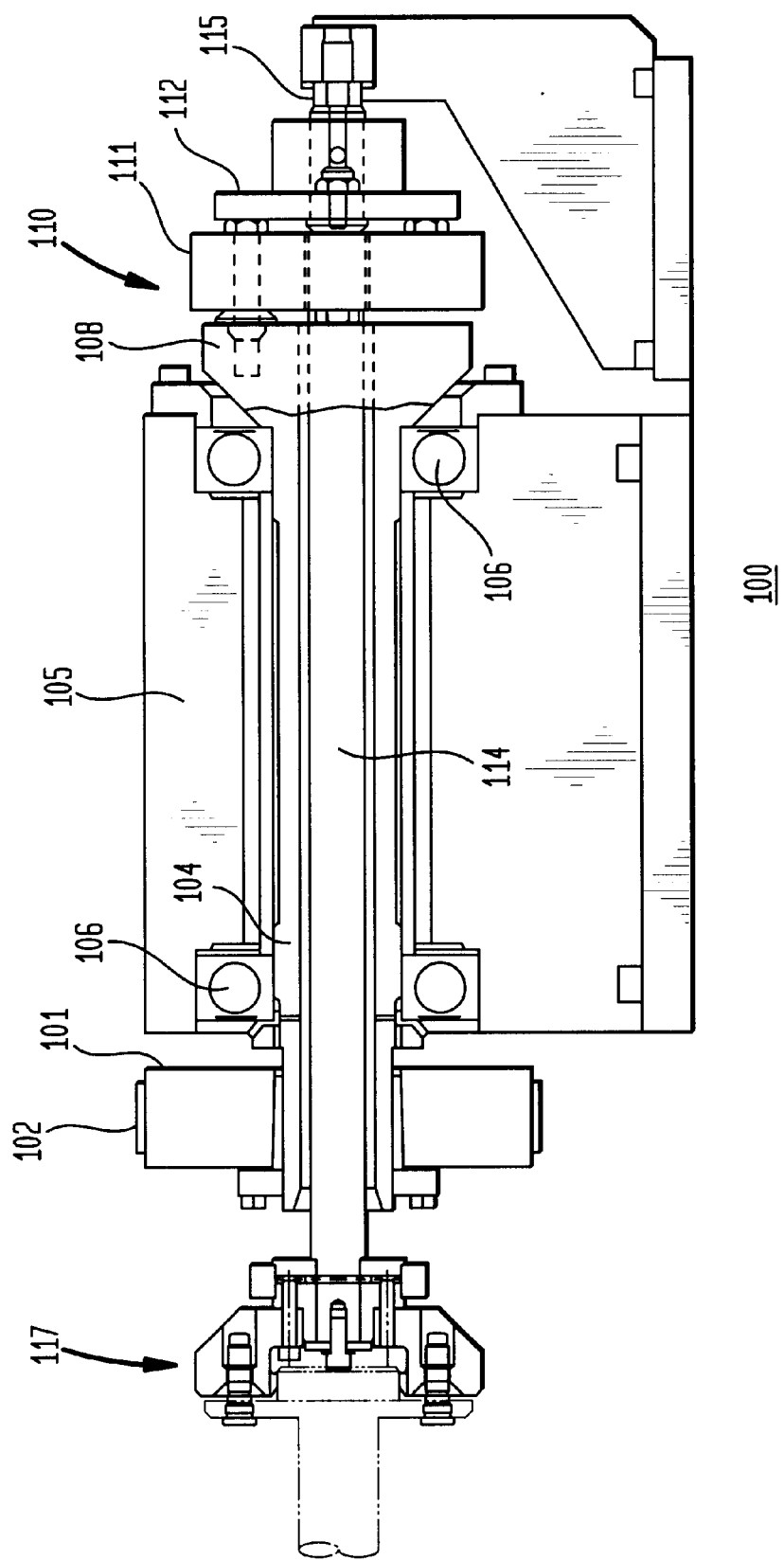
FIG. 12 is a partially cross-sectional side plan view of the compact drive arrangement of FIG. 11 further showing a resilient coupling element.

FIG. 12 is a partially cross-sectional side plan view of a compact drive arrangement similar in some respects to that of FIG. 11. This figure shows a shaft support system 100 that provides the degree of freedom of motion discussed hereinabove with respect to the embodiment of FIG. 11, and additionally provides axial thrust support. Shaft support system 100 is provided with a pulley 101 that can be coupled to another rotatory element (not shown) via a belt 102. The pulley is fixed to a tubular shaft 104 that is axially fixed in a support 105 by ball bearings 106. At the other end of tubular shaft 104, the tubular shaft is expanded radially to form a shaft portion 108 having a large diameter than the central portion of the tubular shaft. A resilient coupling arrangement that is generally designated as 110 is resiliently coupled to shaft portion 108. Resilient coupling arrangement 110 is provided with an intermediate plate 111 and an end plate 112 that are resiliently coupled to one another whereby they rotate with tubular shaft 104. A central shaft 114 is coupled at its right-most end to end plate 112 so as to be rotatable therewith. The central shaft, however, experiences freedom of movement in all directions transverse to its axis of rotation. Any travel of central shaft 114 toward the right hand side is limited by an end stop 115, which is arranged, in this embodiment, to provide a measure of axial adjustment. The other end of central shaft 114 is coupled to a resilient coupling arrangement which is generally designated as 117.

Figure 13:
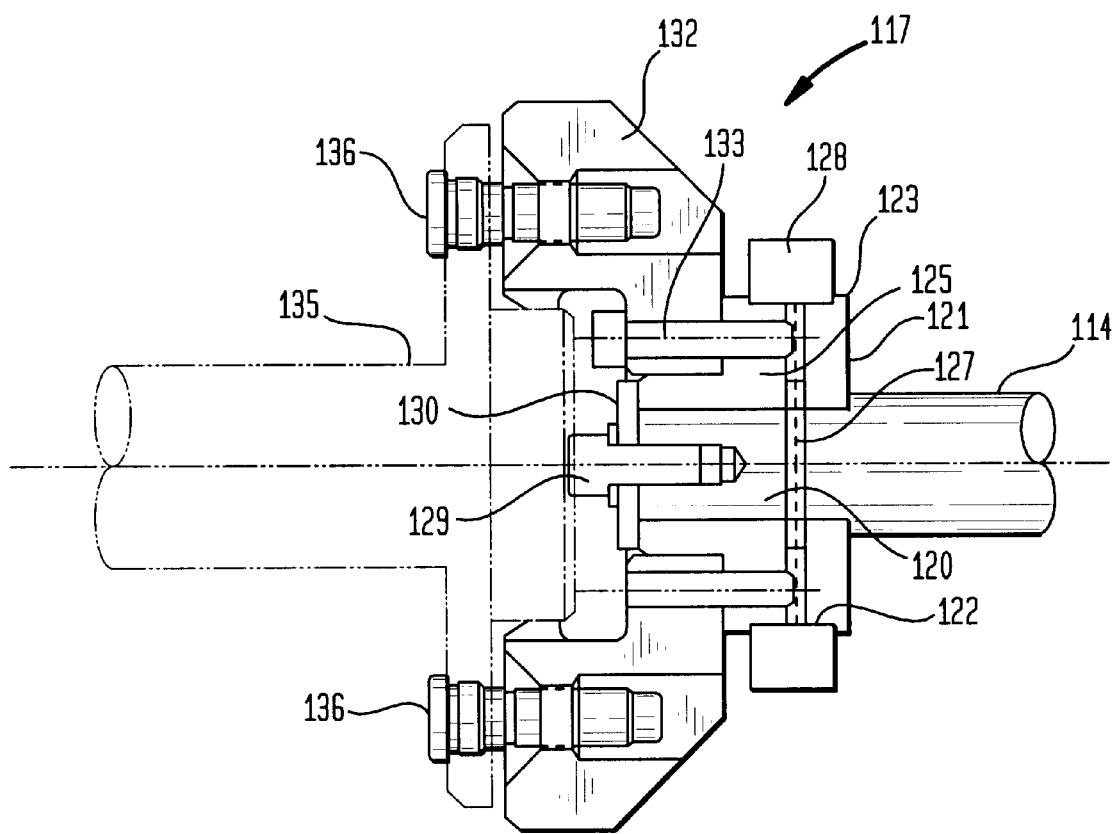
FIG. 13 is a partially phantom enlarged representation of the resilient coupling element shown in FIG. 12.

FIG. 13 is a partially phantom enlarged representation of the resilient coupling element shown in FIG. 12. Resilient coupling element 117 is shown in this figure in an expanded form to facilitate this detailed description. Central shaft 114 (FIG. 12) has a reduced diameter end portion 120 on which is installed a flanged washer 121 having a reduced diameter portion 122 and a flange 123 formed therearound. A further flanged element 125 is installed on reduced diameter end portion 120 of central shaft 114, a shear pin 127 being disposed between flanged washer 121 and further flanged element 125. In addition, an annular portion 128 is arranged to surround the flanged washer and the further flanged element, and to overlie circumferentially the axial region where resilient element 127 is disposed. All of these elements are secured to reduced diameter end portion 120 of central shaft 114 by a fastener 129 and a washer 130. As shown, fastener 129 is threadedly engaged axially onto the end of central shaft 114.

A support portion 132 is fixed onto further flanged element 125 by fasteners 133. Support portion 132 is resiliently coupled to a flanged shaft 135 by means of studs 136. Thus, even though central shaft 114 enjoys freedom of movement transverse to its axis of rotation, resilient coupling arrangement 117 provides yet further freedom of movement in all directions transverse to the axis of rotation for flanged shaft 135. Flanged shaft 135, in one embodiment of the invention, is ultimately coupled to a rotatory output, such as rotatory output 15 of FIG. 1. Alternatively, shaft support system 100 can be used in the drive arrangement of FIG. 6 to provide significant degree of motion lateral to the axis of rotation to the drive shaft.

Figure 14:
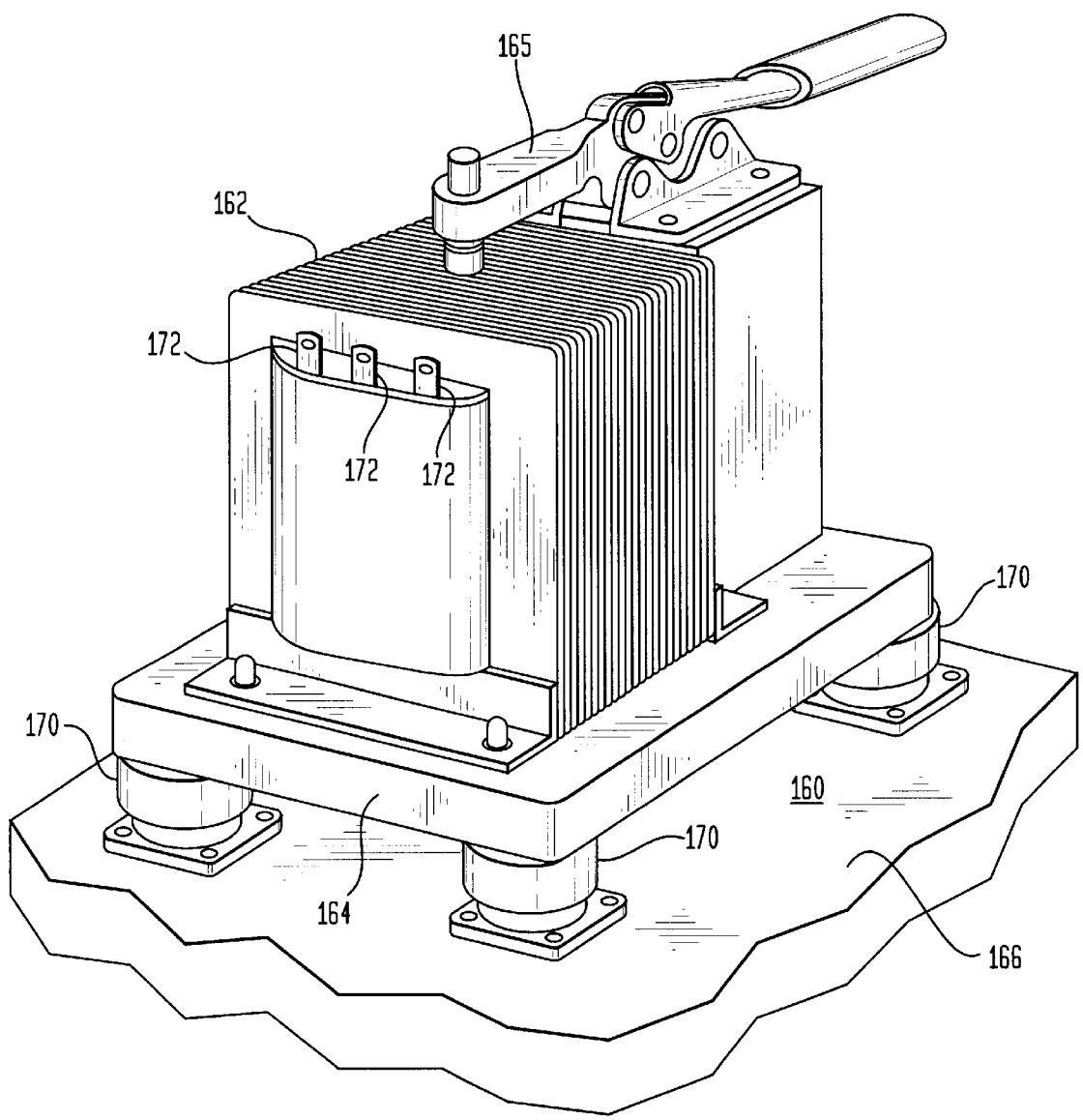
FIG. 14 is an isometric representation of an arrangement for isolating a system under test, constructed in accordance with the principles of the invention, the system under test being an electrical energy transfer device.

FIG. 14 is an isometric representation of an arrangement for isolating a system under test, the isolation system being constructed in accordance with the principles of the invention. In this embodiment, the system under test is an electrical energy transfer device. As shown in this figure, an isolation support 160 isolates an electrical energy transfer device, illustratively in the form of an electrical transformer 162. The electrical transformer is secured to an isolation base 164 by operation of a toggle locking device 165. Isolation base 164 is mechanically isolated from a ground surface 166 by a plurality of resilient isolation elements 170. That is, the isolation base is permitted freedom of movement in at least one plane of motion, and preferably a plurality of planes of motion, by operation of the resilient isolation elements.

In the practice of this specific illustrative embodiment of the invention, the resilient isolation elements have a resilience characteristic that, as previously noted in regard of other embodiments of the invention, exclude a natural frequency of isolation support 160 and transformer 162. The motion of the transformer and the isolation support is therefore responsive substantially entirely to the electrical energy that is transferred to or from transformer 162 via its electrical terminals 172.

Figure 15:
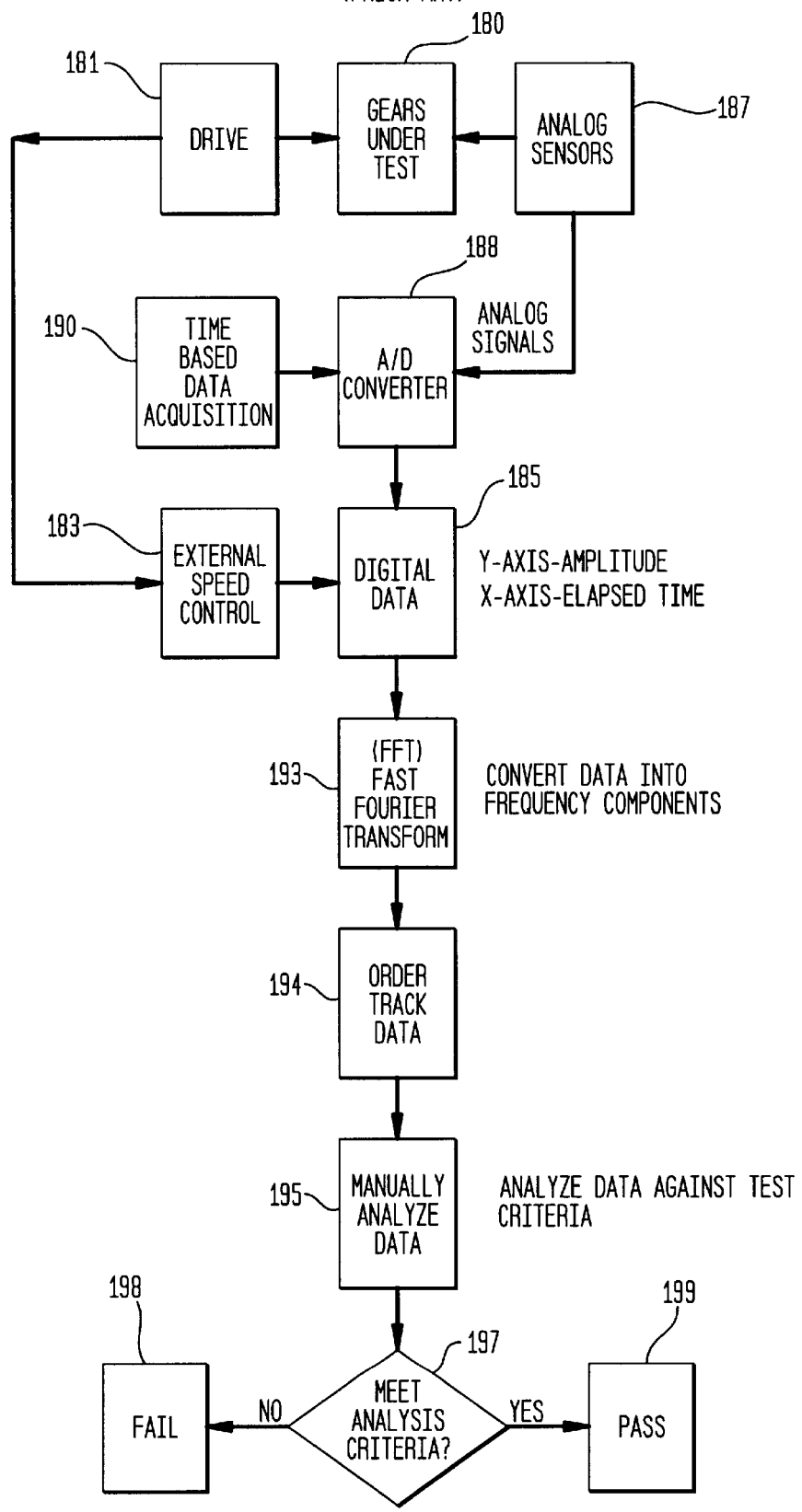
FIG. 15 is a process diagram of a typical process for conducting an energy analysis.

FIG. 15 is a process diagram of a typical process for conducting an energy analysis of a gear system. In this known system, gears under test 180 are driven by a drive 181, the speed of which is controlled by a speed control 183. Information relating to the drive speed is conducted to a digital data storage system 185.

Analog sensors 187 obtain analog data from gears under test 180, the analog signals from the sensors being conducted to an A/D converter 188. The A/D converter performs the conversion of the analog signals in response to a clock 190, and the resulting digital data is conducted to digital data storage system 185. Thus, digital data storage system 185 contains the digitized analog signals obtained from sensors 187, which data is correlated to the speed at which gears under test 180 are driven.

The digital data of digital data storage system 185 is converted to the frequency domain by subjecting same to a fast Fourier transform at step 193. The resulting frequency components are then ordered at step 194 and analyzed manually at step 195. At this step, the collected data, in the frequency domain, is analyzed in the context of predetermined test criteria. The pass/fail decision is then made at step 197, and if the predetermined criteria is not met, a "fail" indication is produced at step 198. Otherwise, a "pass" indication is issued at step 199.

Figure 16:
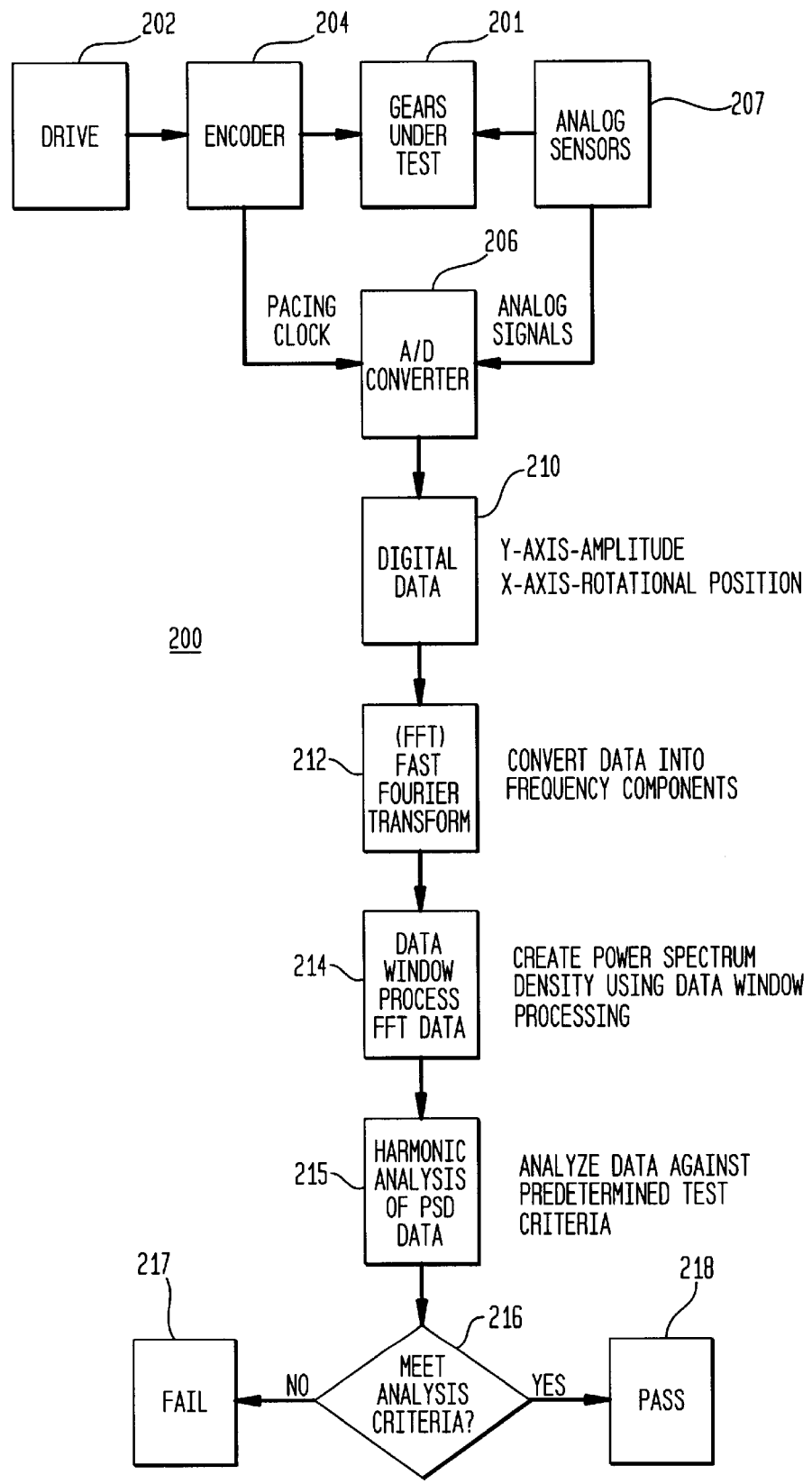
FIG. 16 is a process diagram of a process for conducting an energy analysis in accordance with the principles of the present invention.

FIG. 16 is a process diagram of a process for conducting an energy analysis in accordance with the principles of the present invention. As show in this figure, gears under test 201 are driven into rotation by a drive system 202, which also drives an encoder 204. Encoder 204 delivers signals responsive to the rotation of gears under test 201 to an A/D converter 206. In this embodiment, the signal from encoder 204 serves as a pacing clock for the A/D converter. Information relating to noise and displacement issued by the gears under test is collected by analog sensors 207. The resulting analog signals are conducted to A/D converter 206 where they are converted to digital signals correlated to the rotation of drive system 202.

The digital signals from A/D converter 206 are conducted to a digital data store 210 where they are maintained in correlation to the drive information obtained from encoder 204. In this specific illustrative embodiment of the invention, the digital data is stored two-dimensionally, wherein sensor signal amplitude is identified with the y-axis, and rotational position is identified with the x-axis. The correlated digital data is subjected to a fast Fourier transform at step 212 wherein the data is converted into its frequency components.

Data in the frequency domain is subjected to processing at step 214, where a power spectrum density is created using a data window. The power spectrum density data is then analyzed harmonically at step 215 to determine its relationship with predetermined test criteria. The decision whether the power spectrum density data passes or fails with respect to predetermined test criteria is made at step 216, and the predetermined criteria is not met, a "fail" indication is produced at step 217. Otherwise, a "pass" indication is issued at step 218.

Figure 17:
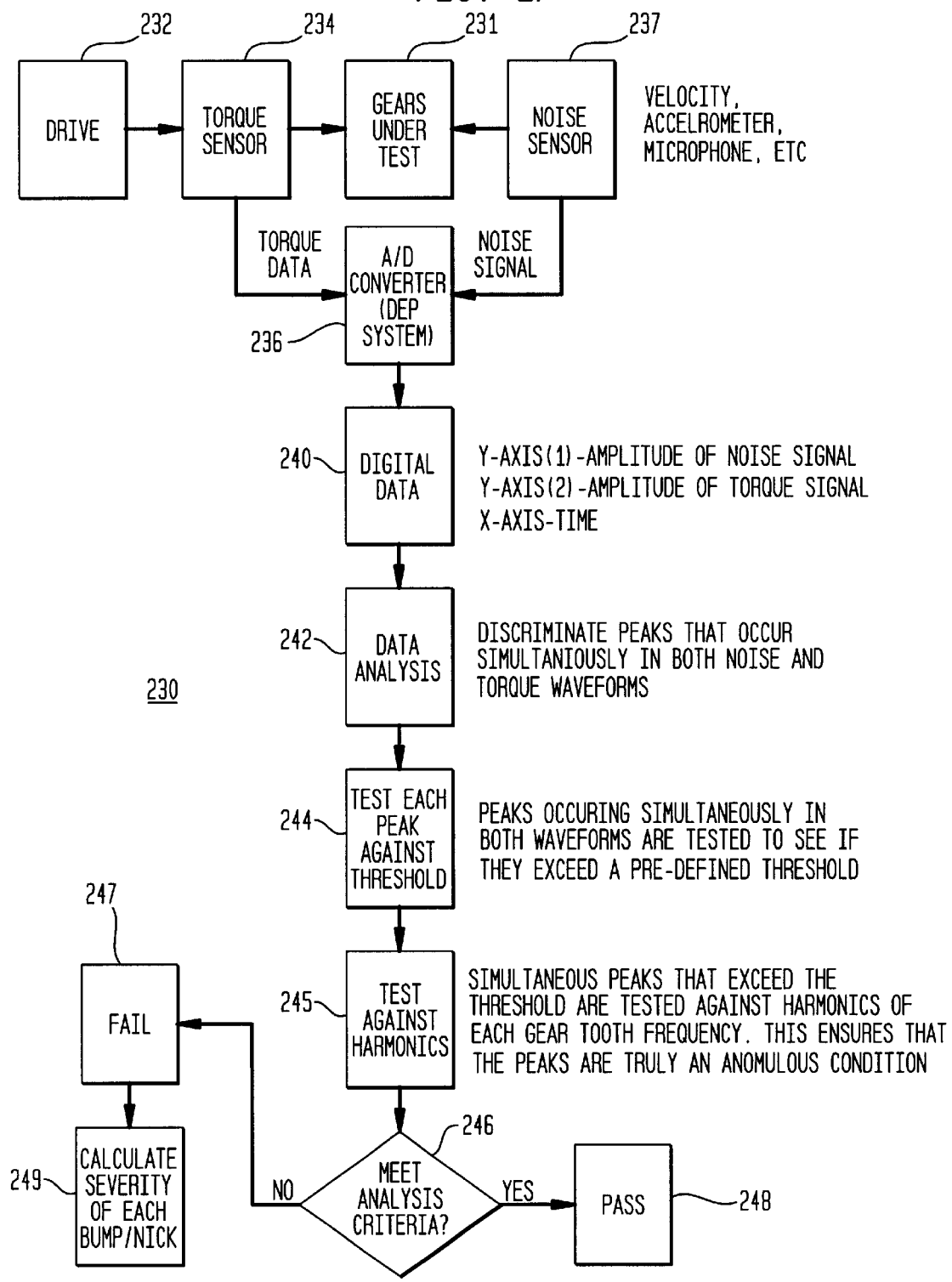
FIG. 17 is a process diagram of a process for conducting an energy analysis in accordance with the principles of the present invention for determining bumps and nicks in a mechanical energy transfer system.

FIG. 17 is a diagram of a process for conducting an analysis 230 in accordance with the principles of the present invention for determining bumps and nicks in a mechanical energy transfer system. As show in this figure, gears under test 231 are driven into rotation by a drive system 232, via a torque sensor 234. Torque sensor 234 delivers signals responsive to the rotatory force supplied to gears under test 231 to an A/D converter 236. Information relating to noise and displacement issued by the gears under test is collected by noise sensors 237, which may include velocity sensors (not shown in this figure), accelerometers (not shown in this figure), microphones (not shown in this figure), etc. The resulting noise signals are conducted to A/D converter 236 where they are converted to digital signals correlated to the torque applied by drive system 232 to gears under test 231.

The digital signals from A/D converter 236 are conducted to a digital data store 240 where they are maintained in correlation to the drive information obtained from torque sensor 234. In this specific illustrative embodiment of the invention, the digital data is stored as two two-dimensional data sets, wherein noise sensor signal amplitude is identified with a first y-axis, and time is identified with the x-axis. The amplitude of the torque signal is identified with a second y-axis, and time is again identified with the x-axis.

Correlated data from digital data store 240 is subjected to analysis at step 242, wherein peaks that occur simultaneously in the torque and noise signal waveforms are identified. These peaks are then measured at step 244 to determine whether they exceed predetermined thresholds. Those peaks that exceed the predetermined thresholds are then tested at step 245 against the harmonics of each gear tooth frequency, to determine whether the peaks correspond to anomalous conditions.

The decision whether the gears under test pass or fail with respect to predetermined test criteria is made at step 246, and if the predetermined criteria is not met, a "fail" indication is produced at step 247. Otherwise, a "pass" indication is issued at step 248. In some embodiments of the invention, a calculation of the severity of the bumps or nicks that caused the anomalous conditions is calculated at step 249.

In one embodiment of the process of FIG. 17, analysis is performed using only the torque data derived from torque sensor 234, without correlation to the noise data obtained from noise sensor 237. In this embodiment, therefore, noise sensor 237 need not be provided, as the noise signal therefrom is not used. Thus, torque sensor 234 delivers signals responsive to the rotatory force supplied to gears under test 231 to A/D converter 236, and the digital data is stored as a single two-dimensional data set, wherein the amplitude of the torque signal is identified with the y-axis, and time is identified with the x-axis.

Peaks in the torque signal are then measured at step 244 to determine whether they exceed a predetermined threshold. Those peaks that exceed the predetermined thresholds are then tested at step 245 against the harmonics of each gear tooth frequency, to determine whether the peaks correspond to anomalous conditions.

The decision whether the gears under test pass or fail with respect to predetermined test criteria is made at step 246, and if the predetermined criteria is not met, a "fail" indication is produced at step 247. Otherwise, a "pass" indication is issued at step 248. As previously noted, a calculation of the severity of the bumps or nicks that caused the anomalous condition is calculated at step 249.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof

What is claimed is:

1. An arrangement for isolating an energy transfer system while it is subjected to a test process for noise, the energy transfer system being of the type having an energy input and at least one energy output, the arrangement comprising:

a base;

an energy supply coupled to the energy transfer system for supplying energy thereto;

an isolation support for supporting the energy transfer system whereby the energy transfer system is translatable in at least one plane of freedom with respect to said base during receipt of, and in response to, the energy supplied thereto by said energy supply; and an engagement arrangement for securing the energy transfer system to said isolation support, said engagement arrangement having a first position with respect to said base wherein the energy transfer system is installable on, and removable from, said isolation support, and a second position wherein the energy transfer system is secured to said isolation support.

2. The arrangement of claim 1, wherein said energy supply is coupled to the energy transfer system for supplying energy thereto when said engagement arrangement is in said second position.

3. The arrangement of claim 2, wherein the energy transfer system is a mechanical energy transfer system, and said energy supply comprises a source of rotatory mechanical energy.

4. The arrangement of claim 3, wherein there is further provided a rotatory coupler for coupling said source of rotatory mechanical energy to the energy transfer system.

5. The arrangement of claim 4, wherein said mechanical energy transfer system has forward and reverse directions of operation, and drive and coast modes of operation for each of the forward and reverse directions of operation.

6. The arrangement of claim 5, wherein there the mechanical energy transfer system contains at least a pair of meshed elements, at least one of said pair of meshed elements being a gear having a plurality of gear teeth thereon, said gear teeth each having first and second gear tooth surfaces for communicating with the other element of said pair of meshed elements, a mechanical energy transfer communication between the pair of meshed elements being effected primarily via the respective first gear tooth surfaces during forward-drive and reverse-coast modes of operation, and primarily via the respective second gear tooth surfaces during forward-coast and reverse-drive modes of operation.

7. The arrangement of claim 6, wherein there is further provided a first acoustic sensor arranged at a first location in the vicinity of the mechanical energy transfer system for producing a first signal responsive substantially to a qualitative condition of said first gear tooth surfaces.

8. The arrangement of claim 7, wherein there is further provided a second acoustic sensor arranged at a second location in the vicinity of the mechanical energy transfer system for producing a second signal responsive substantially to a qualitative condition of said second gear tooth surfaces.

9. The arrangement of claim 8, wherein the first and second locations are distal from each other on opposite sides of said pair of meshed elements.

10. The arrangement of claim 4, wherein said rotatory coupler comprises a resilient coupler arrangement that transmits rotatory motion thereacross over a predetermined range of rotatory motion transmission angles.

11. The arrangement of claim 10, wherein said resilient coupler arrangement comprises first and second coupler portions, said first and second coupler portions being rigidly coupled rotationally to each other, and axially resiliently coupled to each other, whereby said first and second coupler portions are synchronously rotatable over the predetermined range of rotatory motion transmission angles.

12. The arrangement of claim 10, wherein said resilient coupler arrangement comprises first and second coupler portions, said first and second coupler portions being rigidly coupled rotationally to each other, and radially resiliently coupled to each other, whereby said first and second coupler portions are synchronously rotatable over a predetermined range of axial displacement.

13. The arrangement of claim 3, wherein there is further provided a torque sensor interposed between said source of rotatory mechanical energy and the energy transfer system for producing a signal responsive to a torque applied by said source of rotatory mechanical energy to the energy transfer system.

14. The arrangement of claim 13, wherein said torque sensor comprises a torque-transmitting element having a predetermined deformation characteristic, said torque-transmitting element being deformed in response to the torque applied by said source of rotatory mechanical energy to the energy transfer system.

15. The arrangement of claim 14, wherein said torque sensor further comprises a strain sensor coupled to said torque-transmitting element for producing a strain signal responsive to the predetermined deformation characteristic of said torque-transmitting element.

16. The arrangement of claim 13, wherein said torque sensor is arranged to produce a static torque signal responsive to the magnitude of torque required to initiate rotatory motion in said mechanical energy transfer system.

17. The arrangement of claim 13, wherein said torque sensor is arranged to produce a dynamic torque signal responsive to the magnitude of torque required to maintain rotatory motion in said mechanical energy transfer system.

18. The arrangement of claim 2, wherein the energy transfer system is an electrical energy transfer system, and said energy supply comprises a source of electrical energy.

19. The arrangement of claim 18, wherein there is further provided an electrical load for receiving an output electrical energy from the energy transfer system when said engagement arrangement is in said second position.

20. The arrangement of claim 2, wherein there is further provided a first sensor arranged to communicate with the energy transfer system for producing an information signal responsive to an operating characteristic of the energy transfer system in response to the energy supplied by said energy supply.

21. The arrangement of claim 20, wherein said first sensor is arranged to contact the energy transfer system for producing a signal responsive to a predetermined operating characteristic of the energy transfer system in response to the energy supplied by said energy supply.

22. The arrangement of claim 20, wherein said first sensor is arranged to contact said isolation support for producing a signal responsive to a predetermined operating characteristic of the energy transfer system in response to the energy supplied by said energy supply.

23. The arrangement of claim 20, wherein said first sensor is arranged to be translatable relative to the energy transfer system.

24. The arrangement of claim 20, wherein said first sensor comprises a microphone for producing a signal responsive to an acoustic energy issued by the energy transfer system in response to the energy supplied by said energy supply.

25. The arrangement of claim 24, wherein there is further provided a signal controller for controlling the amplitude of the signal responsive to the acoustic energy issued by the energy transfer system in response to the energy supplied by said energy supply, said signal controller being responsive to a temperature characteristic of the energy transfer system.

26. The arrangement of claim 25, wherein said signal controller is nonlinearly responsive to the temperature characteristic of the energy transfer system.

27. The arrangement of claim 20, wherein said first sensor comprises a laser sensor for producing a signal responsive to a displacement of the energy transfer system in response to the energy supplied by said energy supply.

28. The arrangement of claim 20, wherein said first sensor comprises an accelerometer.

29. The arrangement of claim 20, wherein said sensor comprises a velocity sensor.

30. The arrangement of claim 1, wherein said isolation support comprises a resilient support element for supporting the energy transfer system, said resilient support element having a resilience frequency characteristic that excludes a natural frequency of any combination of said base, said engagement arrangement, and the energy transfer system.

31. The arrangement of claim 1, wherein said isolation support supports the energy transfer system whereby it is translatable in at least a second plane of freedom with respect to said base.

32. The arrangement of claim 1, wherein there is further provided an engagement driver having a first portion for coupling to said base, and a second end for coupling to said engagement arrangement.

33. The arrangement of claim 32, wherein said engagement driver comprises a linear actuator having a first end for coupling to said base, and a second end for coupling to said engagement arrangement, said linear actuator being arranged to drive said engagement arrangement between said first and second positions, and being decoupled from said engagement arrangement when said engagement arrangement is in the second position.

34. The arrangement of claim 32, wherein there is further provided an engagement coupler interposed between said engagement arrangement and said engagement driver means, said engagement coupler comprising:
   a support portion installed on said isolation support;
   first and second engagement arms pivotally coupled to said support portion and
   first and second articulated members coupled at a pivot point to one another and to said engagement driver means, and being pivotally coupled at distal ends thereof to respective ones of said first and second engagement arms, whereby said engagement driver means urges the pivot point along a predetermined path to a latching position beyond where said first and second articulated members are axially parallel.

35. The arrangement of claim 34, wherein there is further provided resilient biasing means installed on at least one of said first and second engagement arms for applying a resilient biasing force to the energy transfer system.

36. The arrangement of claim 35, wherein said resilient biasing means applies a resilient biasing force that maintains said engagement arrangement in the second position.

37. The arrangement of claim 34, wherein there is further provided displacement sensor means installed on at least one of said first and second engagement arms for producing a distance signal responsive to a distance between the at least one of said first and second engagement arms and the energy transfer system, the distance signal being responsive to a predetermined dimension of the energy transfer system.

38. The arrangement of claim 1, wherein there is further provided a thermal sensor for producing a thermal signal responsive to a temperature of the energy transfer system.

39. The arrangement of claim 38, wherein said thermal sensor comprises an infrared sensor for communicating optically with the energy transfer system.

40. The arrangement of claim 38, wherein said thermal sensor has a directional characteristic and is directed to a predetermined region of the energy transfer system for determining a rate of change of temperature of the predetermined region with respect to time.

41. The arrangement of claim 38, wherein the response of the variation of the amplitude of the noise signal with respect to temperature is in accordance with a non-linear amplitude-temperature relationship.

42. An arrangement for isolating a mechanical drive system for a vehicle while it is subjected to a testing process, the drive system being of the type having a rotatory input and at least one rotatory output, the arrangement comprising:

a base;

an isolation support for supporting the mechanical drive system whereby the mechanical drive system is translatable in at least one plane of freedom with respect to said base;

an engagement arrangement for securing the mechanical drive system to said isolation support, said engagement arrangement having a first position with respect to said base wherein the mechanical drive system is installable on, and removable from, said isolation support, and a second position wherein the mechanical drive system is secured to said isolation support;

an engagement driver coupled to said base and to said engagement arrangement for urging said engagement arrangement between said first and second positions, said engagement arrangement being coupled to said engagement driver when said engagement arrangement is in said first position, and isolated from said engagement driver when said engagement arrangement is in said second position;

a rotatory drive for applying a rotatory drive force to the mechanical drive system; and a drive coupler for transmitting a torque from said rotatory drive to the rotatory input of the mechanical drive system, whereby the mechanical drive system is translatable in the plane of freedom in response to the rotatory drive force.

43. The arrangement of claim 42, wherein there is further provided a torque sensor interposed between said rotatory drive and the mechanical drive system for producing a signal responsive to a torque applied by said rotatory drive to the mechanical drive system.

44. The arrangement of claim 43, wherein said torque sensor is arranged to produce a static torque signal responsive to the magnitude of torque required to initiate rotatory motion in said mechanical drive system.

45. The arrangement of claim 43, wherein said torque sensor is arranged to produce a dynamic torque signal responsive to the magnitude of torque required to maintain rotatory motion in said mechanical drive system.

46. The arrangement of claim 43, wherein said torque sensor comprises a torque-transmitting element having a predetermined deformation characteristic, said torque-transmitting element being deformed in response to the torque applied by said rotatory drive system to the mechanical drive system.

47. The arrangement of claim 46, wherein said torque sensor further comprises a strain sensor coupled to said torque-transmitting element for producing a strain signal responsive to the predetermined deformation characteristic of said torque-transmitting element.

48. The arrangement of claim 42, wherein there is further provided a sensor arranged to communicate with the mechanical drive system for producing an information signal responsive to an operating characteristic of the mechanical drive system in response to the rotatory drive force.

49. The arrangement of claim 48, wherein there is additionally provided further sensor arranged to communicate with the mechanical drive system for producing a further information signal responsive to a further operating characteristic of the mechanical drive system in response to the rotatory drive force.

50. The arrangement of claim 49, wherein the operating characteristic and the further operating characteristic of the mechanical drive system correspond to drive and coast operating modes in response to a direction of torque of the rotatory drive force.

51. The arrangement of claim 48, wherein said sensor is arranged to be translatable between a first position distal from the mechanical drive system, and a second position where said sensor communicates with the mechanical drive system.

52. The arrangement of claim 48, wherein said sensor comprises a microphone responsive to an acoustic energy issued by the mechanical drive system in response to the rotatory drive force.

53. The arrangement of claim 48, wherein said sensor comprises an accelerometer.

54. The arrangement of claim 48, wherein said sensor comprises a velocity sensor.

55. The arrangement of claim 48, wherein said sensor is installed on said engagement arrangement, and is translatable therewith between the respective first and second positions.

56. The arrangement of claim 48, wherein said sensor comprises a non-contact sensor for producing a displacement signal responsive to displacement of the mechanical drive system in response to the rotatory drive force.

57. The arrangement of claim 56, wherein said non-contact sensor comprises a laser sensor for communicating optically with the mechanical drive system.

58. The arrangement of claim 48, wherein said sensor comprises a non-contact sensor for producing a thermal signal responsive to a temperature of the mechanical drive system.

59. The arrangement of claim 58, wherein said non-contact sensor comprises an infrared sensor for communicating optically with the mechanical drive system.

60. The arrangement of claim 59, wherein said infrared sensor has a directional characteristic and is directed to a predetermined region of the energy transfer system for determining a rate of change of temperature of the predetermined region with respect to time.

61. The arrangement of claim 59, wherein there is further provided an acoustic sensor sensitivity controller responsive to said thermal sensor for varying the amplitude of a noise signal in response to temperature.

62. The arrangement of claim 61, wherein the response of the variation of the amplitude of the noise signal with respect to temperature is in accordance with a non-linear amplitude-temperature relationship.

63. The arrangement of claim 42, wherein said isolation support comprises a resilient support element for supporting the mechanical drive system, said resilient support element having a resilience frequency characteristic that excludes a natural frequency of the mechanical drive system.

64. The arrangement of claim 63, wherein said resilience frequency characteristic of said resilient support element excludes a natural frequency of said drive coupler.

65. The arrangement of claim 42, wherein there are further provided:

a rotatory load arrangement for applying a rotatory load to the mechanical drive system; and a load coupler for coupling said rotatory load arrangement to the rotatory input of the mechanical drive system.

66. The arrangement of claim 65, wherein the mechanical drive system is a drive-transmitting component for a motor vehicle, and said rotatory load arrangement applies a controllable rotatory load thereto to simulate a plurality of vehicle operating conditions.

67. The arrangement of claim 66, wherein the vehicle operating conditions include gear drive and coast conditions.

68. The arrangement of claim 66, wherein the vehicle operating conditions include a gear float condition.

69. The arrangement of claim 42, wherein said engagement driver comprises a linear actuator having a first end for coupling to said base, and a second end for coupling to said engagement arrangement.

70. The arrangement of claim 69, wherein there is further provided an engagement coupler interposed between said engagement arrangement and said engagement driver, said engagement coupler comprising:

a support portion installed on said isolation support;

first and second engagement arms pivotally coupled to said support portion;

first and second articulated members coupled at a pivot point to one another and to said linear actuator, and being pivotally coupled at distal ends thereof to respective ones of said first and second engagement arms, whereby said linear actuator urges the pivot point along a linear path to a latching position beyond where said first and second articulated members are axially parallel.

71. The arrangement of claim 70, wherein there is further provided a resilient biasing arrangement installed on at least one of said first and second engagement arms for applying a resilient biasing force to the energy transfer system.

72. The arrangement of claim 71, wherein said resilient biasing arrangement applies a resilient biasing force that maintains said engagement arrangement in the second position.

\* \* \* \* \*

UNITED STATES PATENT AND TRADEMARK OFFICE
CERTIFICATE OF CORRECTION

PATENT NO. : 6,523,422 B1
DATED : February 25, 2003
INVENTOR(S) : James C. Juranitch and Robert D. Olschefski It is certified that error appears in the above-identified patent and that said Letters Patent is hereby corrected as shown below:

Column 20,
Line 10, after "in" insert -- response to vibration --;

Column 24,
Line 1, delete "additionally"; and
Line 2, after "provided" insert -- a --.

Signed and Sealed this

Seventh Day of October, 2003

JAMES E. ROGAN
*Director of the United States Patent and Trademark Office*